US008495711B2

(12) United States Patent
Small et al.

(10) Patent No.: US 8,495,711 B2
(45) Date of Patent: Jul. 23, 2013

(54) REMOTE ROAMING CONTROLLING SYSTEM, VISITOR BASED NETWORK SERVER, AND METHOD OF CONTROLLING REMOTE ROAMING OF USER DEVICES

(75) Inventors: Keith MacPherson Small, Lake Echo (CA); Charles Arthur Taylor Feild, Bedford (CA); James Randolph Currie, Dartmouth (CA)

(73) Assignee: SolutionInc Limited, Nova Scotia (CA)

( * ) Notice: Subject to any disclaimer, the term of this patent is extended or adjusted under 35 U.S.C. 154(b) by 399 days.

(21) Appl. No.: 12/837,538

(22) Filed: Jul. 16, 2010

(65) Prior Publication Data

US 2011/0023093 A1    Jan. 27, 2011

(30) Foreign Application Priority Data

Jul. 17, 2009 (CA) ..................... 2672642

(51) Int. Cl.
*H04L 29/00* (2006.01)
(52) U.S. Cl.
USPC ............... 726/4; 713/155; 713/156; 713/157; 713/158; 713/159
(58) Field of Classification Search
USPC .................................. 713/155–159
See application file for complete search history.

(56) References Cited

U.S. PATENT DOCUMENTS

| 6,151,331 | A | 11/2000 | Wilson |
| 6,970,944 | B2 | 11/2005 | Johnson et al. |
| 7,069,340 | B1 | 6/2006 | Evans et al. |
| 7,149,219 | B2 | 12/2006 | Donahue |
| 7,286,539 | B2 | 10/2007 | Tsuge et al. |
| 7,356,841 | B2 | 4/2008 | Wilson et al. |
| 7,401,160 | B2 | 7/2008 | Johnson et al. |
| 7,463,607 | B2 | 12/2008 | Sood et al. |
| 7,477,894 | B1 | 1/2009 | Sinha |
| 7,502,841 | B2 * | 3/2009 | Small et al. ................... 709/223 |
| 7,529,810 | B2 | 5/2009 | Goto et al. |
| 7,552,202 | B2 | 6/2009 | Brown et al. |
| 7,649,866 | B2 | 1/2010 | Chari et al. |
| 2002/0009078 | A1 | 1/2002 | Wilson et al. |
| 2002/0136226 | A1 | 9/2002 | Christoffel et al. |
| 2005/0256958 | A1* | 11/2005 | Wilson ........................ 709/227 |
| 2006/0136226 | A1* | 6/2006 | Emam ......................... 704/277 |
| 2006/0233128 | A1 | 10/2006 | Sood et al. |
| 2008/0281464 | A1 | 11/2008 | Sorensen et al. |
| 2009/0193103 | A1 | 7/2009 | Small et al. |

FOREIGN PATENT DOCUMENTS

| EP | 1 113 640 | 7/2001 |
| EP | 1 746 803 | 1/2007 |

* cited by examiner

*Primary Examiner* — Ghazal Shehni
(74) *Attorney, Agent, or Firm* — Carmody & Torrance LLP

(57) ABSTRACT

An authorization assisting device sends to the VBN server an authorization request for access to the WAN by a requesting user device. A registration driver has a set of assignable IP address ranges for multiple routing realms, and assigns an IP address to a user device from a relevant IP address range depending on a routing realm from which communication from the user device is received. The assignable IP address ranges include one or more authorization address ranges from which the registration driver assigns an IP address to a user device whose authorization request is received from the authorization assisting device. An authorization module processes the authorization request to generate an authorization response granting or denying access to the WAN by the requesting user device based on registration data in a registration data store and the information in the authorization request.

27 Claims, 13 Drawing Sheets

REMOTE ROAMING CONTROLLING SYSTEM, VISITOR BASED NETWORK SERVER, AND METHOD OF CONTROLLING REMOTE ROAMING OF USER DEVICES

FIELD OF THE INVENTION

The present invention relates to a visitor based network (VBN) server, and more specifically, to a remote roaming controlling system, VBN server, and method of controlling remote roaming of user devices.

BACKGROUND OF THE INVENTION

There are many mobile users who want to have temporary access to the Internet using their computer devices at various locations. In order to provide network services to those user devices, visitor based networks (VBNs) are provided in various locations, such as hotels, airports and convention centers. Often users are required to register with VBN servers to use those visitor based networks.

Large and/or complicated visitor based networks may be formed by many sub-networks, each sub-network having a routing device or bridging device within the topmost level of the network hierarchy. A user may want to move between those sub-networks of a visitor based network, e.g., moving from a hotel room to a hotel conference hall.

Also, there exist some authorization helper or assisting devices that can send authorization requests on behalf of user devices.

It is preferable to provide a mechanism that can handle authorization of user access to a network while allowing user devices to move between sub-networks without a need to re-register with the same VBN server.

SUMMARY OF THE INVENTION

It is an object of the invention to provide an improved mechanism that can control remote roaming of user devices that obviates or mitigates at least one of the disadvantages of existing systems.

The invention uses a visitor based network (VBN) server and an authorization assisting device that has network connectivity with the VBN server, and assigns appropriate internet protocol (IP) addresses to roaming user devices from specific address ranges.

In accordance with an aspect of the present invention, there is provided a remote roaming management system for managing access to a wide area network (WAN) by user devices. The remote roaming management system comprises a visitor based network (VBN) server, an authorization assisting device, a registration driver, a registration data store, and an authorization module. The VBN server is connected to the WAN for managing network traffic which is routed between the WAN and network entities on a local area network (LAN) behind the VBN server. The authorization assisting device has network connectivity with the VBN server for sending to the VBN server an authorization request for access to the WAN by a requesting user device, the authorization request incorporating information of the requesting user device. The registration driver is provided for managing registration of user devices. The registration driver has a set of assignable Internet protocol (IP) address ranges for multiple routing realms, and assigns an IP address to a user device from a relevant IP address range depending on a routing realm from which communication from the user device is received, the set of assignable IP address ranges including an authorization address range from which the registration driver assigns an IP address to a user device whose authorization request is received from the authorization assisting device. The registration data store is provided for storing registration data of registered user devices, registration data of a registered user device including its authorization state, assigned IP address, and user device's Media Access Control (MAC) address. The authorization module is provided for processing the authorization request to generate an authorization response granting or denying access to the WAN by the requesting user device based on the registration data in the registration data store and the information in the authorization request.

In accordance with another aspect of the present invention, there is provided a visitor based network (VBN) server connected to a wide area network (WAN) for managing network traffic which is routed between the WAN and network entities on a local area network (LAN) behind the VBN server. The VBN server comprises a network entity interface handler, a registration driver, a registration data store and an authorization module. The network entity interface handler is provided for handling communication with an authorization assisting device that sends to the VBN server an authorization request for access to the WAN by a requesting user device, the authorization request incorporating information of the requesting user device. The registration driver is provided for managing registration of user devices. The registration driver has a set of assignable internet protocol (IP) address ranges for application to multiple routing realms, and assigns an IP address to a user device from a relevant IP address range depending on a routing realm from which communication from the user device is received, the set of assignable IP address ranges including an authorization address range from which the registration driver assigns an IP address to a user device whose authorization request is received at the VBN server from the authorization assisting device. The registration data store is provided for storing registration data of registered user devices, registration data of a registered user device including its authorization state, assigned IP address, and user device's Media Access Control (MAC) address. The authorization module is provided for processing the authorization request to generate an authorization response granting or denying the access to the WAN by the requesting user device based on the registration data in the registration data store and the information in the authorization request.

In accordance with another aspect of the present invention, there is provided a method of managing access to a wide area network (WAN) by user devices. The method comprises the steps of receiving, by a Visitor Based Network (VBN) server from an authorization assisting device, an authorization request for access to a Wide Area Network (WAN) by a requesting user device, the authorization request incorporating information of the requesting user device, the VBN server managing a set of assignable Internet protocol (IP) address ranges, including an authorization address range and one or more routed address ranges and/or one or more bridged address ranges, each of the routed and bridged address ranges being associated with a routing realm behind the VBN server; assigning to the requesting user device an IP address from the authorization address range; and processing the authorization request to generate an authorization response granting or denying the access to the WAN by the requesting user device based on the information in the authorization request and registration data of registered user devices stored in a registration data store, registration data of a registered user device including its authorization state, assigned IP address, and user device's Media Access Control (MAC) address.

In accordance with another aspect of the present invention, there is provided a computer readable medium storing computer readable code for execution in a computer, the code having instructions for implementing a method of managing access to a wide area network (WAN) by user devices. The instructions comprising the steps of receiving, by a Visitor Based Network (VBN) server from an authorization assisting device, an authorization request for access to a Wide Area Network (WAN) by a requesting user device, the authorization request incorporating information of the requesting user device, the VBN server managing a set of assignable internet protocol (IP) address ranges, including an authorization address range and one or more routed address ranges and/or one or more bridged address ranges, each of the routed and bridged address ranges being associated with a routing realm behind the VBN server; assigning to the requesting user device an IP address from the authorization address range; and processing the authorization request to generate an authorization response granting or denying the access to the WAN by the requesting user device based on the information in the authorization request and registration data of registered user devices stored in a registration data store, registration data of a registered user device including its authorization state, assigned IP address, and user device's Media Access Control (MAC) address.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
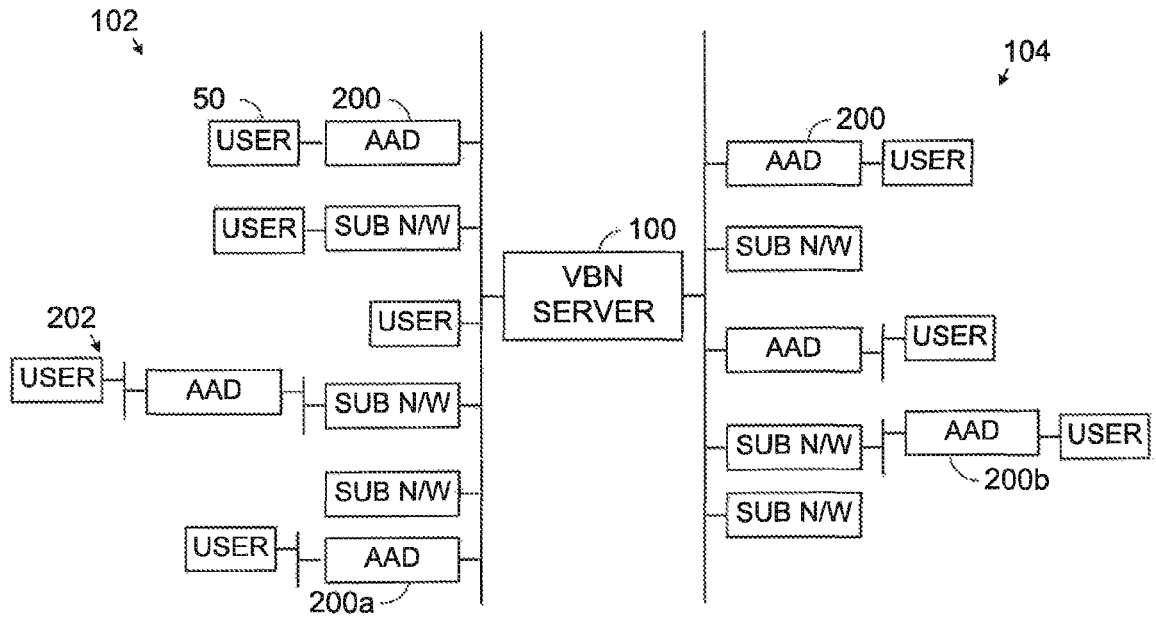
FIG. 1 is a block diagram showing a remote roaming management system in accordance with an embodiment of the present invention.

Referring to FIG. 1, a remote roaming management system in accordance with an embodiment of the present invention is described. The remote roaming management system comprises a visitor based network (VBN) server 100 and one or more authorization assisting devices 200 that has network connectivity with the VBN server 100 through a wired or wireless network or networks.

The VBN server 100 is a server that manages network traffic routing between network entities on a local area network (LAN) 102 behind the VBN server 100 and an outside network or wide area network (WAN) 104, such as the Internet. Network entities are devices connected to the LAN 260, and which possess internet protocol (IP) addresses and which send traffic to and receive traffic from the VBN server 200. The VBN server 100 provides network provisioning services to those network entities. The VBN server 100 also locally or remotely manages authorization of user devices to access the WAN 104, as further described below.

An authorization assisting device 200 may reside on the LAN 102 or on the WAN 104, and communicates with the VBN server 100 through the LAN 102 or the WAN 104, respectively. An authorization assisting device 200 on the LAN 102 may be called a local authorization assisting device 200a, and an authorization assisting device 200 on the WAN 104 may be called a remote authorization assisting device 200b, hereinafter. An authorization assisting device 200 may have its LAN 202 behind the authorization assisting device 200.

A user device 50 may be connected to the LAN 102, an authorization assisting device 200 connected to a LAN 102 or a WAN 104, or a LAN 202 behind an authorization assisting device 200. A user device 50 on the LAN 102 may be called a local user device 50a, and a user device 50 on the WAN 104 may be called a remote user device 50b, hereinafter. A user device 50 may roam or move from one sub-network to another sub-network of these networks 102, 104, 202. A sub-network is a network connected to other networks or network entities by a network head end device, such as a router or a bridge. Those sub-networks that contain routing devices and bridging devices within the topmost level of the network hierarchy can be considered to consist of several routing realms. A routing realm is, within the context of this document, a term referring to the network space behind a routing device, or the network space behind a group of interconnected bridging devices. Also, a user device 50 may roam from behind an authorization assisting device to another portion of the network, or from a portion of the network to behind an authorization assisting device.

The VBN server 100 manages allocation or assignment of an IP address to a user device. The VBN server 100 maintains the registration state of user devices on the LAN 102. Also, the VBN server 100 maintains the registration state of user devices on the WAN 104, when the user devices are associated with an authorization assisting device 200 that has network connectivity with the VBN server 100. The VBN server 100 maintains the registration state of the user devices which are located behind authorization assisting devices on the LAN 102 and on the WAN 104 in the same manner as it does for a traditional local user device on the LAN 102. A traditional local user device is a fixed user device that does not roam, and which is not located behind an authorization assisting device The VBN server 100 facilitates sub-network traversals by user devices by automatically detecting such traversals, and then assigning new and appropriate IP addresses to the roaming user devices, while maintaining those user devices' VBN registration settings. Consequently, a roaming user device does not need to re-register with the VBN server 100 each time it traverses or changes sub-networks, and data of that user device, e.g., billing and identification data, which is maintained by the VBN server 100 remains relevant after the sub-network traversals, as further described below.

Figure 2:
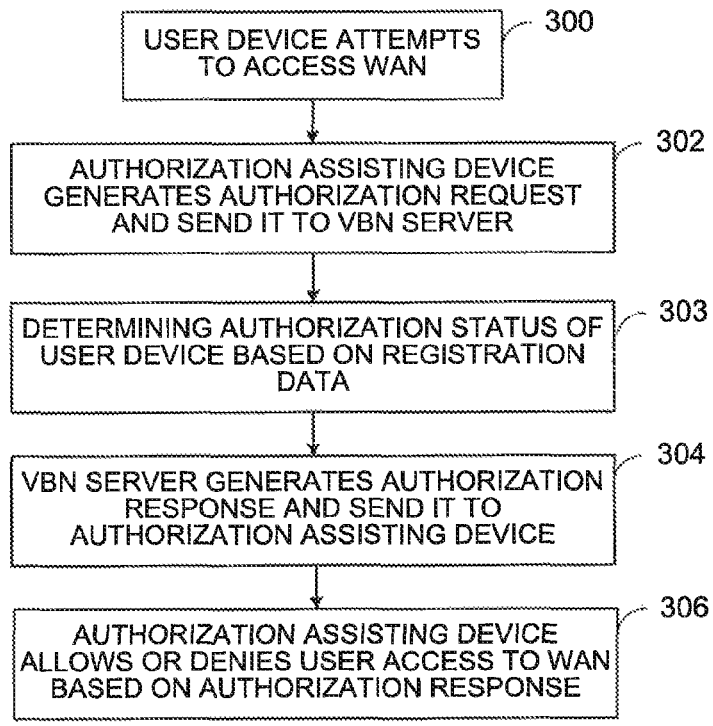
FIG. 2 is a flowchart showing an embodiment of authorization process by the remote roaming management system.

The authorization assisting device 200 is responsible for enforcing the authorization state of the user device 50. The authorization assisting device 200 may directly or indirectly enforce the authorization state of the user device 50, e.g., may deny the traffic of the of the user device 50 by itself or may instruct another device that controls the traffic of the of the user device 50 to do so. As shown in FIG. 2, when a user device 50 attempts to access the WAN 104 (300), an authorization assisting device 200, to which the user device 50 is directly or indirectly connected, generates an authorization request and sends it to the VBN server 100 on behalf of the user device 50 (302). In response to the authorization request, the VBN server 100 determines the authorization status of the user device 50 based on the registration data maintained in the VBN server 100, and generates an authorization response indicating the granting or denying of access to the WAN by the user device 50 (303). The VBN server 100 returns the authorization response to the authorization assisting device 200 (304). The authorization assisting device 200 allows or denies, or enforces another associated network component to allow or deny, the user device 50 to access the WAN 104 depending on the authorization response (306).

For a user device connected to an authorization assisting device 200, the authorization assisting device 200 may act as a network provisioner for that user device. The authorization assisting device 200 may also serve as a network gateway or router for that user device so that the WAN-bound traffic of that user device flows through the authorization assisting device 200 on its way to the WAN 104. In that case, the VBN server 100 does not act as a network provisioner or as the immediate network gateway or router for that user device.

Figure 3:
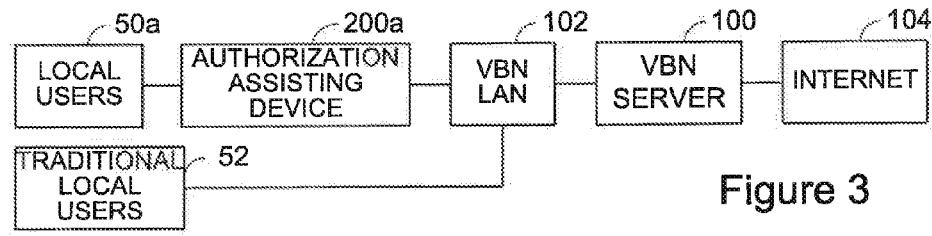
FIG. 3 is a diagram showing an example of relative locations of network entities with a local authorization assisting device.

FIG. 3 schematically shows an example of relative locations of network entities when a local authorization assisting device 200a is used. In this example, local users 50a are connected to the local authorization assisting device 200a, which is connected through the VBN server's LAN 102 to the VBN server 100, which is in turn connected to the WAN or the Internet 104. Also, traditional local user devices 52 may be connected to the VBN server's LAN 102.

In this case, since the authorization assisting device 200a is located on the VBN server's LAN 102, the VBN server 100 acts as the authorization assisting device's network provisioner and network gateway or router. The VBN server's LAN 102 serves as the authorization assisting device's WAN.

Figure 4:
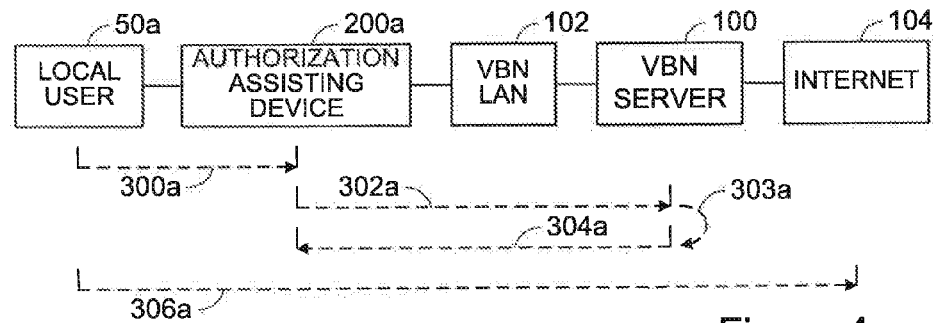
FIG. 4 is a diagram showing an example of authorization process using the local authorization assisting device.

FIG. 4 schematically shows an example of an authorization process using a local authorization assisting device 200a, which is acting as a gateway for a local user device 50a. When the local user device 50a attempts to access the WAN or Internet 104 (300a), the local authorization assisting device 200a receives the access attempt signal, and generates and transmits an authorization request to the VBN server 100 on behalf of the local user device 50a through the VBN server's LAN 102 (302a). In response to the authorization request, the VBN server 100 determines the authorization state of the local user device 50a (303a), and returns an authorization response to the local authorization assisting device 200a through the VBN server's LAN 102 (304a). If the authorization response acknowledges authorization, the local authorization assisting device 200a allows, or enforces another associated network component to allow, the WAN-bound traffic from the local user device 50a to the WAN or Internet 104 (306a).

Figure 5:
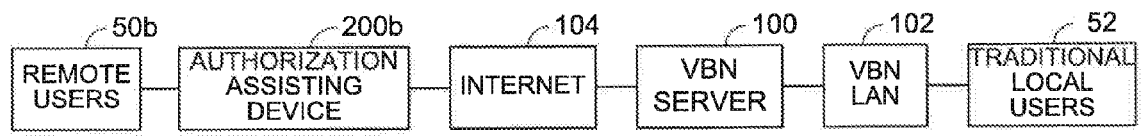
FIG. 5 is a diagram showing an example of relative locations of network entities with a remote authorization assisting device.

FIG. 5 schematically shows an example of relative locations of network entities when a remote authorization assisting device 200b is used. In this example, remote users 50b are connected to the remote authorization assisting device 200b, which is connected through the VBN server's WAN or the Internet 104 to the VBN server 100, which is in turn connected to the LAN 102. Also, traditional local user devices 52 may be connected to the VBN server's LAN 102.

In this case, since the authorization assisting device 200b is not present within the VBN server's LAN 102, the communication between the VBN server 100 and the authorization assisting device 200b occurs through the VBN server's WAN or the Internet 104. This allows the user device 50 and the user's authorization assisting device 200 to be located at any logical and physical location, provided that there is network connectivity from that location to the WAN-side connection of the VBN server 100.

Also, in this case, the VBN server 100 is not responsible for the network provisioning of the remote user devices 50b because the remote user devices 50b are not present on the VBN server's LAN 102. The VBN server 100 is responsible only for granting and denying the user access to the WAN 104, by accepting and responding to authorization requests sent on behalf of the remote user devices 50b by the authorization assisting device 200.

Figure 6:
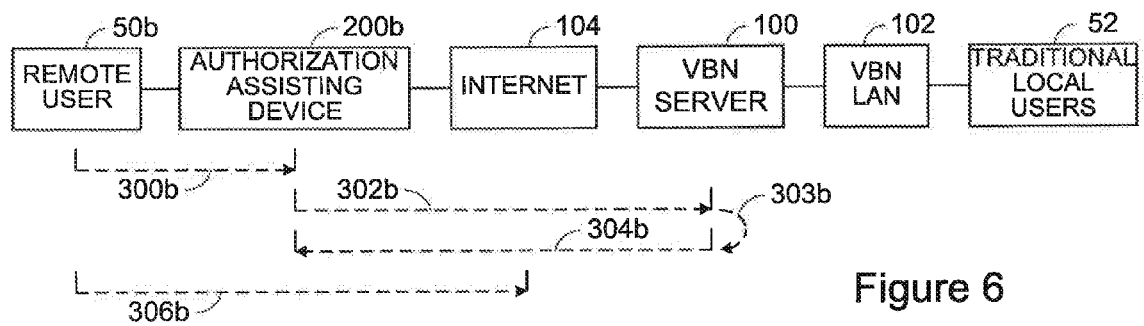
FIG. 6 is a diagram showing an example of authorization process using the remote authorization assisting device.

FIG. 6 schematically shows an example of an authorization process using a remote authorization assisting device 200b, which is acting as a gateway for a remote user device 50b. When the remote user device 50b attempts to access to the WAN or Internet 104 (300b), the remote authorization assisting device 200b receives the access attempt signal, and generates and transmits an authorization request to the VBN server 100 on behalf of the remote user device 50b through the Internet 104 (302b); In response to the authorization request, the VBN server 100 determines the authorization state of the remote user device 50b (303b), and returns an authorization response to the remote authorization assisting device 200b through the Internet (304b). If the authorization response acknowledges authorization, the remote authorization assisting device 200b allows, or enforces another associated network component to allow, the WAN-bound traffic from the remote user device 50b to the WAN or the Internet 104 (306b).

Figure 7:
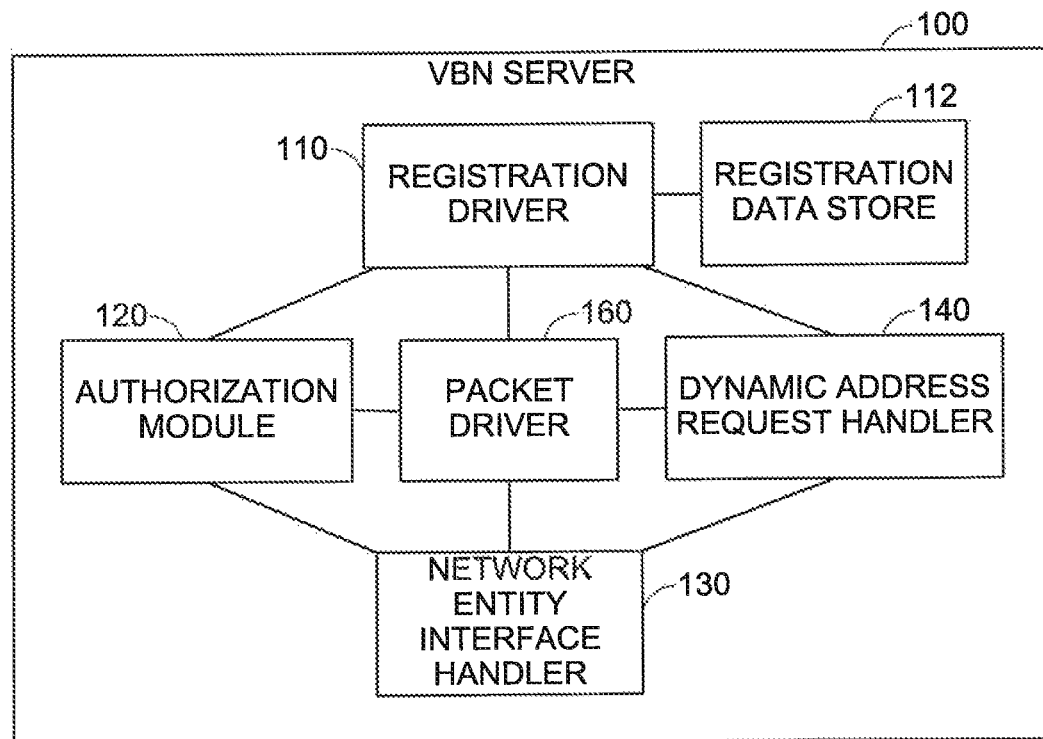
FIG. 7 is a block diagram showing an embodiment of a VBN server.

FIG. 7 shows an embodiment of the VBN server 100. The VBN server 100 has a registration driver 110, a registration data store 112, an authorization module 120, a network entity interface handler 130, a dynamic address request handler 140 and a packet driver 160.

The registration driver 110 manages registration of user devices and other network entities. The registration driver 110 has a set of assignable internet protocol (IP) address ranges, and manages allocation or assignment of an IP address to a registered user device from one of the IP address ranges. The registration driver 110 maintains registration data of registered user devices in the registration data store 112. A registration data entry of an authorized user device includes authorization status and an assigned IP address, possibly but not always necessarily in association with a user Media Access Control (MAC) address of the user device, as further described below.

The authorization module 120 processes each received authorization request, and determines if a user device 50 is authorized to access the WAN 104 based on the user information in the received authorization request and the registration state of the user device 50 in the registration data store 112. The authorization module 120 generates an authorization response, granting or denying the user access to the WAN 104 depending on the determination.

The network entity interface handler 130 facilitates communication between the VBN server 100 and network entities. The network entity interface handler 130 receives authorization requests from authorization assistance devices and transmits authorization responses to the authorization assistance devices connected to the VBN server 100.

The dynamic address request handler 140 handles a request for dynamic address assignment, e.g., a Dynamic Host Configuration Protocol (DHCP) request, from user devices. The packet driver 160 recognizes and handles a user device roaming between the routing realms. The packet processor 130 may consider user MAC addresses so that a user device which is the subject of an authorization request can be associated with a pre-existing registration state which may already exist in the registration data store 112 on the VBN server 100, as further described below.

Figure 8:
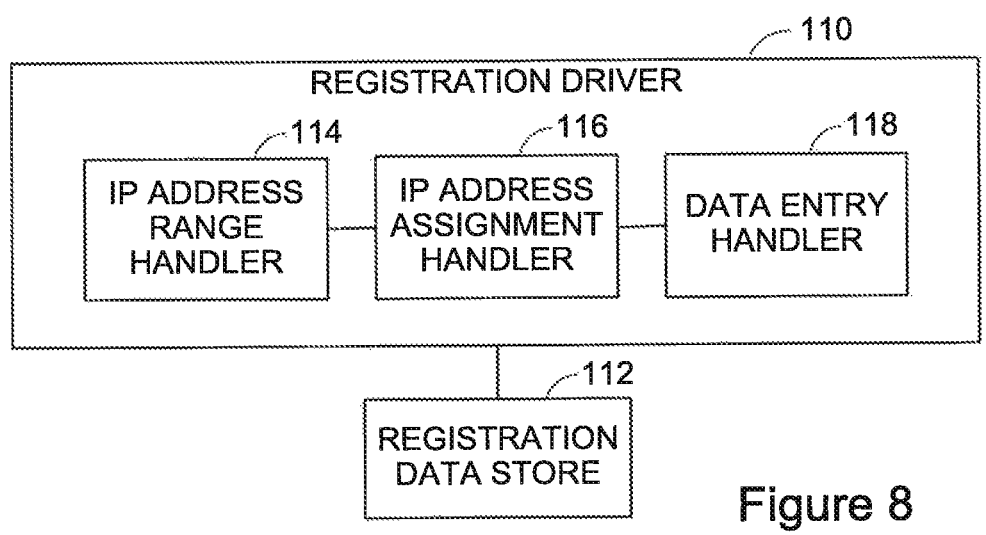
FIG. 8 is a block diagram showing an embodiment of a registration driver of the VBN server.

As a user device roams between routing realms, the registration driver 110 assigns appropriate IP addresses to that user device, while maintaining the registration state of that user device in association with the currently assigned IP address of that user device. FIG. 8 shows an embodiment of the registration driver 110. The registration driver 110 in this embodiment has an IP address range handler 114, an IP address assignment handler 116, and a data entry handler 118.

The IP address range handler 114 manages a set of assignable IP address ranges. The assignable IP address ranges reflect the IP addresses which are assigned to user devices located behind authorization assisting devices, or which belong to or are associated with the various routing realms presented to the VBN server 110 by the LAN 102 of the VBN server 100. A routing realm may be a network space behind a routing device, a network space behind a group of interconnected bridging devices. Accordingly, the assignable IP address ranges that the IP address range handler 114 manages include three classifications: routed address ranges, bridged address ranges and authorization address ranges.

The routed address ranges are configured on the VBN server 100 to be assigned to network entities behind particular routers on the LAN 102. The bridged address ranges are assigned to bridged entities on the LAN 104. Since each address range is associated with a router which sends traffic directly to the VBN server or, the collection of bridges at the top-level of the VBN server's LAN, the VBN server 100 can provide router-aware IP address assignment.

In addition to those routed ranges and bridged address ranges, the IP address range handler 114 also manages an authorization address range. The assignable IP address range classification "authorization" is used to create the registration driver registration data entries for user devices which have authorized with the VBN server 100 via an authorization assisting device 200. The IP addresses in the authorization address range are neither communicated to the authorizing users, via DHCP, nor used to translate authorizing users' statically-addressed traffic, because, in the case of a WAN-side authorization assisting device, the authorizing users are not located on the VBN server's LAN 102, or in the case of a LAN-side authorization assisting device 200a acting as a gateway, not located directly on the VBN server's LAN 102. An authorizing user is a user device that is located behind an authorization assisting device, which intercepts the user's traffic and forces the authorization process. The IP addresses within the authorization address range are used as unique identifiers for use by the normal registration and registration expiration processing of the authorizing users' registration driver entries by the registration driver 110. Also, IP addresses from the authorization address range may be used to facilitate the creation of billing database entries on the VBN server 100. The authorization address range may be implemented by multiple authorization address ranges to save server memory or for other implementation conveniences.

The IP address range handler 114 configures assignable IP address ranges to support a network that has routers, bridges, virtual LANs (VLANs) and authorization assisting devices, for example, as follows:

| | |
|---|---|
| Range A | router R1, VLAN V1 |
| Range B | router R1, VLAN V2 |
| Range C | router R2, VLAN V3 |
| Range D | router R1, VLAN V1 |
| Range E | any router, VLAN V1 |
| Range F | router R1, any VLAN |
| Range G | any router or bridge, any VLAN |
| Range H | any router or bridge, VLAN V2 |
| Range I | any local or remote authorization assisting device's user devices |
| Range J | any local or remote authorization assisting device's user devices |

When the authorization address range is implemented by multiple authorization address ranges, an authorization address range can be used by any and all authorization assisting devices 200 which communicate with the VBN server 100. There is no concept of association of an authorization address range to a particular authorization assisting device.

The IP address assignment handler 116 manages assignment of an IP address to a user device from one of the routed or bridged IP address ranges, depending on the routing realm from which a packet is received.

Routers interconnect distinct sub-networks. Each of these distinct routed sub-networks possesses a distinct IP address space, a routed address range or ranges, which is the collection of IP addresses that 'belong' to or are associated with that routed sub-network. In order for a user device to move from one of these routed sub-networks to another, the IP address of that user device must change from the IP address which was used behind the first router, to an IP address which may be used behind the second router. Thus, when a user device is moved to a routed sub-network, the IP address assignment handler 116 assigns an IP address from a routed address range associated with the router of the routed sub-network.

In a network consisting of a router and one or more bridging devices, the bridged portion of the network is considered a distinct sub-network, relative to that router. The bridged sub-network utilizes a unique IP address space, a bridged address range or ranges, relative to the routed sub-network. Therefore, in order for a user device to move from a sub-network behind the router to a sub-network behind a bridging device, or vice-versa, the IP address of that user device must change. Thus, when a user device is moved to a bridged sub-network, the IP address assignment handler 116 assigns an IP address from a bridged address range associated with the bridged sub-networks of the LAN.

A sub-network behind an authorization assisting unit 200 is also considered by the VBN server as a distinct sub-network, relative to a routed sub-network and a bridged sub-network. Thus, when an authorization request is received from an authorization assisting unit 200 for a user device, the IP address assignment handler 116 assigns an IP address from the authorization address ranges to the user device for a registration data entry in the registration data store for that user device.

The data entry handler 118 handles registration data entries of user devices and other relevant network entities in the registration data store 112. For each user device, the data entry handler 118 creates an entry including but not limited to the user MAC address of the user device, the IP address of the user device, the MAC address of the router through which the user device is connecting, and several user registration settings including authorization state.

Figure 9:
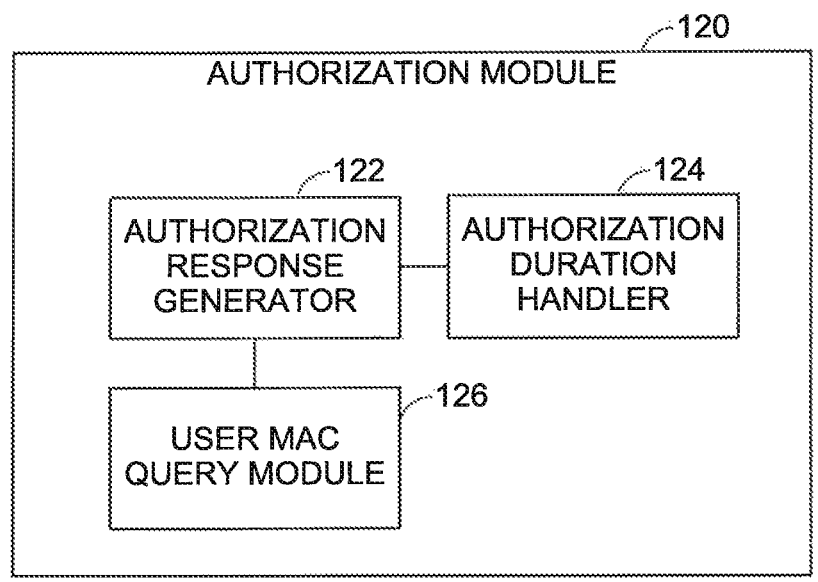
FIG. 9 is a block diagram showing an embodiment of an authorization module of the VBN server.

FIG. 9 shows an embodiment of the authorization module 120. The authorization module 120 in this embodiment has an authorization response generator 122 and an authorization duration handler 124.

The VBN server 100 responds to an authorization request. Authorization requests and responses may each conceivably consist of multiple related messages. The authorization response generator 122 generates an authorization response message in response to an authorization request message. The authorization response generator 122 interacts with the standard and diverse registration request processing mechanisms of the VBN server 100, which include but are not limited to the registration driver 110. The registration driver 110 makes the authorization decision and communicates it to the authorization response generator 122 for generating an authorization response message. The authorization response message may contain only an authorization decision, or it may contain a decision and an authorization duration. If the authorization response message does not contain an authorization duration, the authorization duration handler 124 handles an authorization duration for the user device. The authorization duration handler 124 monitors expiration of the authorization of the user device, and automatically sends the authorization assisting device 200 an authorization termination message when the authorization duration handler 124 determines that the authorization period of the user device has ended.

The authorization response generator 122 compares the information of the user device obtained from a received authorization request with the user data entries in the registration data store 112. For this comparison, the authorization response generator 122 uses user MAC addresses as the unique user identifiers. If there is no match, the authorization response generator 122 creates a new registration entry, using the data which is present within the authorization request message. This data may consist only of user identification data, or it may also include registration duration information, or user credentials such as a credit card number. This new entry possesses at the very least the user's MAC address, an assigned user IP address selected from an Authorization address range, and also the IP address of the authorization assisting device from which the authorization message was received. In this case, the authorization response generator 122 and the registration driver 110 cooperate to decide upon the WAN access decision. The authorization response generator 122 leverages the VBN server's normal support for validating certain user credentials, such as credit card numbers and access codes, and also validating certain authorization request parameters, such as Quality-of-Service and registration duration. Some of this credential and option processing occurs prior to the involvement of the registration driver 110. If this credential and option processing succeeds, or if it is not required at all, then the authorization request generator 122 asks the registration driver 110 to create an authorization entry. If this registration driver entry can be created, then the registration driver grants WAN access. This WAN access decision is communicated by the registration driver 110 to the authorization response generator 122, which generates an authorization response message based on the WAN access decision. The authorization registration driver entry may not always be created: for example, if the VBN server 100 cannot support any more registered users, or if the Authorization range is full.

Alternatively, if there is an existing entry E in the registration data store 112, but that entry is not an Authorizing entry, i.e., it does not possess an IP address from an Authorization address range, then a new registration entry is created which possesses the same registration state as E, but which does possess an assigned user IP address from an Authorization address range, and also an authorization assisting device IP address which is equal to the IP address of the user's current authorization assisting device. In this case, A) if the user's pre-existing entry E is currently granted WAN access, then the VBN server 100 grants the user exactly the same WAN access that the user's pre-existing entry E possesses, or B) if the user's pre-existing entry E is not currently granted WAN access, then the user's authorization request is processed as if there were no pre-existing entry for the user. In case A), the VBN server 100 ignores any authorization request modifiers, such as duration and QoS. This is because the user is not billed for a new or altered registration, and this user's current registration is simply continued.

Alternatively, if there is an existing entry F in the registration data store, and that entry is an Authorizing entry, i.e., it does possess an IP address from an Authorization address range, but that entry F does not possess an authorizing assisting device IP address equal to that possessed by the user's current authorization assisting device, then a new registration entry is created which possesses the same registration state as F, but which possesses a new assigned user IP address from an Authorization address range, and also an authorization assisting device IP address which is equal to that of the user's current authorization assisting device. In this case, the VBN server 100 processes the authorization request in the same manner as described above for the case where there is an existing non-Authorizing entry E.

Therefore, the VBN server 100 can manage user devices' roaming between authorization assisting devices, roaming between direct LAN connections and authorization assisting devices, and the router/bridge roaming.

The authorization module 120 may also have a user MAC query module 126. The authorization response generator 122 uses the user MAC address of the user device to determine if the user device is pre-registered with the VBN server 100, and also to create a new, registered entry for the user device if no pre-existing entry is found, as described above. When the user MAC address is incorporated in the authorization request messages, the authorization response generator 122 can extract and use the user MAC address. When a user device is authorizing from behind an authorization assisting device and if the received authorization request message does not contain the user MAC address but does provide the user's current IP address, the user MAC query module 126 may query the user's current authorization assisting device for the user's MAC address by Simple Network Management Protocol (SNMP) (ipNetToMedia) or a proprietary method of the relevant authorization assisting device.

Figure 10:
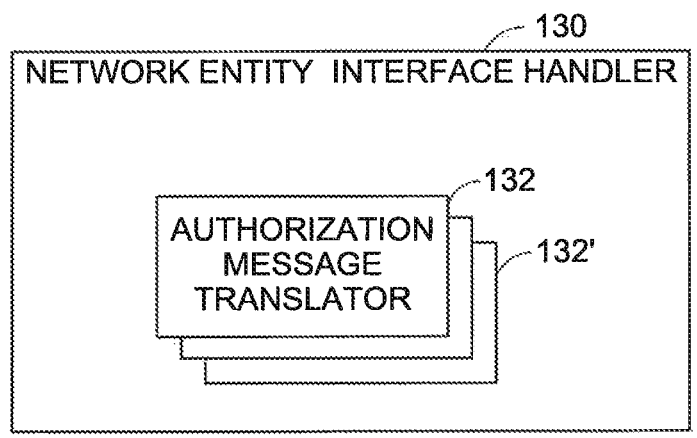
FIG. 10 is a block diagram showing an embodiment of a network entity interface handler of the VBN server.

Authorization messages, i.e., authorization request messages or authorization response messages, may be in various formats. For example, an authorization assisting device 200 may send and receive authorization messages in a format that conforms with a specific protocol. In order for the VBN server 100 and authorization assisting devices to communicate authorization messages, the network entity interface handler 130 may have one or more authorization message parsers or translators 132, as shown in FIG. 10.

An authorization message translator 132 translates a received authorization request message in a format that conforms to a protocol used by the authorization assisting device 200 into an authorization request message of a format that the VBN server 100 uses. Similarly, the authorization message translator 132 translates a generated authorization response message in the VBN server's format into an authorization response message in the authorization assisting device's format. When a new authorization assisting device uses a new format or a new protocol, authorization messages from and to the new authorization assisting device can be handled by only updating or replacing the authorization message translator 132 or by adding a new authorization message translator 132 to the network entity interface handler 130. There is no need to modify other components of the VBN server 100 including the user roaming mechanism because the roaming mechanism is not dependent upon the choice of authorization messaging protocol.

For example, the authorization messages may be sent using high-level protocols, such as HTTP (HyperText Transfer Protocol), XMLRPC (eXtensible Markup Language Remote Procedure Call), and other high-level protocols.

HTTP authorization messages encode identification data and authorization parameters of the user device into an HTTP URL. The VBN server 100 is capable of initiating HTTP communication to the authorization assisting device 200. Thus, the authorization response generator 122 of the VBN server 100 does not need to incorporate the authorization period duration in the authorization response: In that case, the authorization duration handler 124 sends a message later on, when the authorization period has expired, to instruct the authorization assisting device 200 to de-authorize the user device. The following exemplifies these communications:
Authorization Assisting Device 200-HTTP authorization Request-VBN Server 100-HTTP Authorization Request Translator 132-Registration Driver 110
Registration Driver 110-HTTP Authorization Response Translator 132-VBN Server 110-HTTP Authorization Response-Authorization Assisting Device 200
VBN Server Authorization Duration Handler 124-HTTP Authorization Response Translator 132-HTTP De-authorization Request-Authorization Assisting Device 200

XMLRPC authorization messages encode identification data and authorization parameters of the user device into an XMLRPC message. The XMLRPC authorization message communication occurs in the same general fashion as the HTTP authorization message communication, but uses a different authorization message translator 132'.
XMLRPC Authorization Request-XMLRPC Authorization Request Translator 132'-Registration Driver 110
Registration Driver 110-XMLRPC Authorization Response Translator 132'-XMLRPC Authorization Response
VBN Server Authorization Duration Handler 124-XMLRPC Authorization Response Translator 132'-XMLRPC Deauthorization Request-Authorization Assisting Device 200

Figure 11:
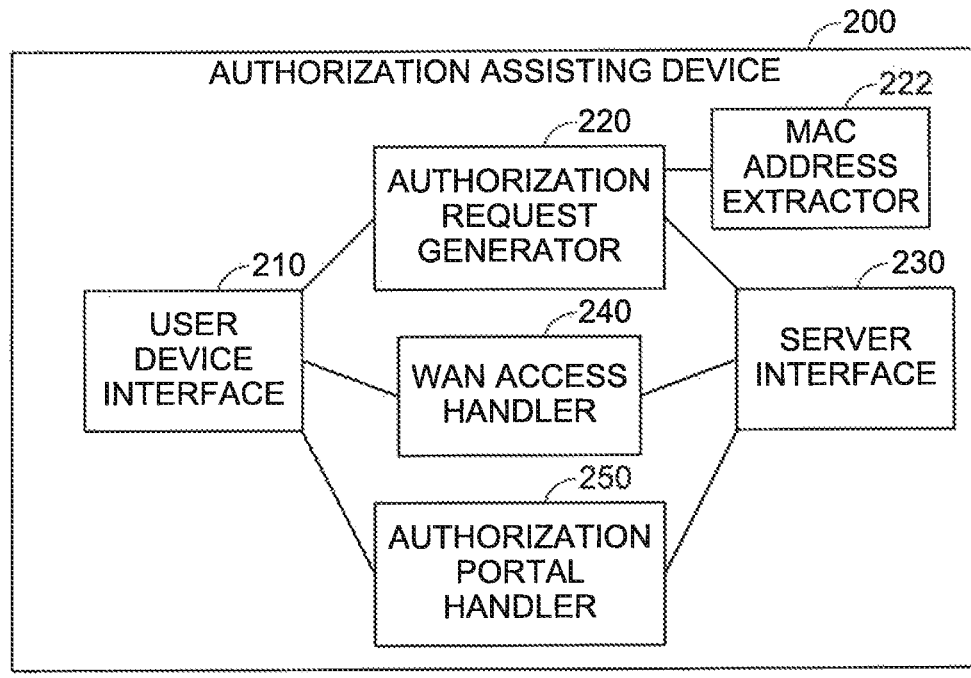
FIG. 11 is a block diagram showing an embodiment of an authorization assisting device.

FIG. 11 shows an embodiment of the authorization assisting device 200. The authorization assisting device 200 in this embodiment has a user device interface 210, an authorization request generator 220, a server interface 230 and a WAN access handler 240.

The user device interface 210 receives an access attempt signal from a user device 50 that attempts to access the WAN 104. The authorization assisting device 200 may receive a user access attempt signal from a user device 50 directly, through the LAN 102 of the VBN server 100, or through the LAN 202 behind the authorization assisting device 200.

The authorization request generator 220 generates an authorization request for the user access to the WAN 104 by the user device 50. The authorization request generator 220 incorporates in the authorization request information of the user device 50 based on the access attempt signal.

The authorization request generator 220 may have a MAC address extractor 222 to extract the user MAC address of the user device 50 from the access attempt signal. In this case, the authorization request generator 220 incorporates the user MAC address into the authorization request for use by the VBN server 100.

The server interface 230 sends the authorization request to the VBN server 100 and receives an authorization response from the VBN server, via LAN 102 or via WAN 104, depending on where the authorization assisting device 200 resides.

The WAN access handler 240 allows or denies the user device 50 to access the WAN 104, or enforces other associated network components to allow or deny the user device 50 to access the WAN 104, according to the authorization response received from the VBN server 100.

As shown in FIG. 11, the authorization assisting device 200 may also have an authorization portal handler 250. The authorization portal handler 250 presents a forced authorization portal to an unauthorized user device 50 behind the authorization assisting device 200 in order to collect data from the user. The collected data is communicated to the VBN server 100 within the authorization request message. The collected data include authorization request parameters, such as requested registration settings, access code, requested registration duration, requested service quality, credit card number, and/or other criteria or user credentials. Also, this forced authorization portal may be used to inform the user of a failed registration. The authorization assisting device 200 may present to unauthorized users on the WAN 104 a forced authorization portal that is comparable to a forced registration page that the VBN server 100 presents to unauthorized users on the LAN 102 of the VBN server 100 to collect such data directly by the VBN server 100. Instead of presenting such a forced authorization portal, an authorization assisting device may transparently send a default authorization request message to the VBN server 100. Also, instead of generating an authorization portal by itself, an authorization assisting device may HTTP redirect the user device behind the authorization assisting device to a portal page which is hosted on the VBN server 100. In this case, no authorization request message is sent from the authorization assisting device to the VBN server 100, and the VBN server 100 collects user data directly from the user device and then sends an authorization confirmation message to the authorization assisting device, which message instructs the authorization assisting device to grant the user access to the WAN of the authorization assisting device.

The authorization request generator 210 of the authorization assisting device 200 transmits an authorization request message to the VBN server 100 on behalf of a user device, and awaits an authorization response message from the VBN server 100. If the VBN server 100 responds with an authorization acknowledgement, then the WAN access handler 240 of the authorization assisting device 200 allows the user access to the WAN 104. Even if the authorization assisting device 200 does not have an authorization portal handler 250 or does not provide a forced authorization portal with a login page to the user, the authorization assisting device 200 still directly or indirectly enforces some scheme for denying and granting the user WAN access, and for initiating authorization request transmission to the VBN server. This scheme may be applying a default registration period to any new user device; automatically and transparently transmitting a default authorization request to the VBN server on behalf of the user device; or enforcing different service levels or registration durations based upon specific or predefined user MAC addresses by transparently sending authorization request messages to the VBN server.

Figure 12:
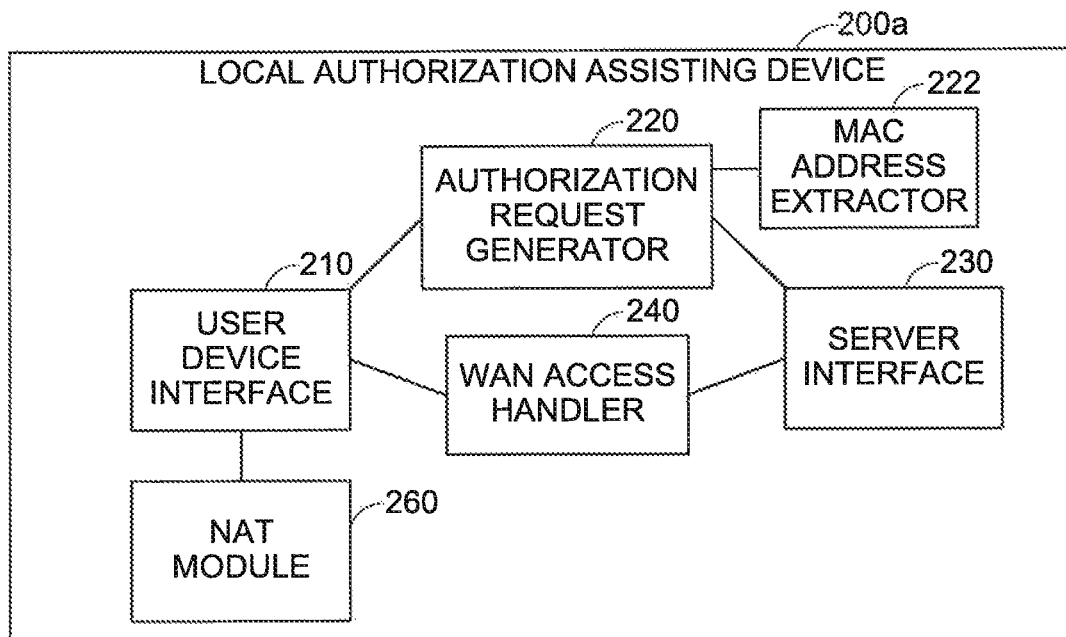
FIG. 12 is a block diagram showing an embodiment of a local authorization assisting device.

FIG. 12 shows an embodiment of a local authorization assisting device 200a that resides on the LAN 102 of the VBN server 100 and acts as a gateway or router for user devices connected to the authorization assisting device 200a. In addition to the elements described above, the local authorization assisting device 200a has a NAT module 260. The NAT module 260 performs Network Address Translation (NAT) on packets from and to a user device connected to the authorization assisting device 200a, changing an IP address of the packets to or from the IP address of the WAN-side of the authorization assisting device 200a, i.e., the VBN server's LAN 102 side, which the VBN server 100 has assigned to that user device. Thus, the VBN server 100 receives only the NATed user traffic. The NATing is carried out in the local authorization assisting device 200a to prevent IP address conflicts between the sub-network behind the authorization assisting device 200 and the sub-networks comprising the VBN server's LAN 102. The VBN server 100 considers this particular NATed user traffic to always be authorized for WAN access, since the authorization assisting device 200 does not transmit the NATed user traffic if the user device is not authorized by the authorization assisting device 200 and consequently also by the VBN server 100.

The handling of roaming user devices by the VBN server 100 is now further described. By virtue of fundamental IP networking principles, the roaming user devices or computers, realistically, need to utilize dynamic address assignment in order to benefit from the VBN server's router roaming support. The VBN server 100 therefore, as a part of the router roaming provisioning process, assigns appropriate IP addresses to routed and bridged users using the DHCP protocol. The VBN server 100 maintains the VBN registration state of the roaming user device as the IP address of that roaming user device changes as a result of the roaming of that user device.

Figure 13:
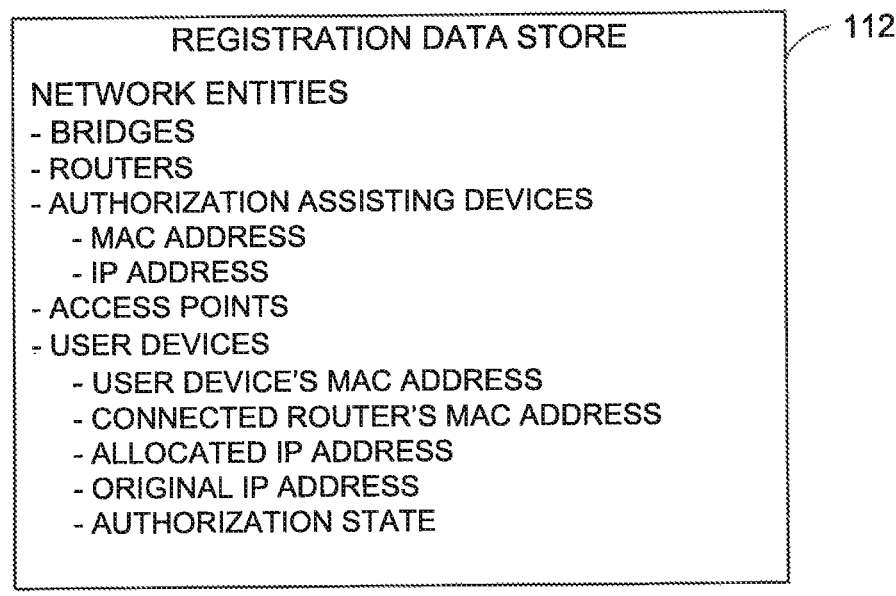
FIG. 13 is a diagram showing an embodiment of a registration data store.

FIG. 13 shows an example of the registration data store 112. The registration driver 110 maintains a list of entries or records for relevant network entities. The relevant network entities include network devices such as bridges, routers, authorization assisting devices, access points, and user devices on the LAN 102 behind the VBN server 100, authorization assisting devices on the WAN 104 that communicates with the VBN server 100, and registered user devices on the WAN 104. Each record for a user device contains several values, including, but not limited to, user device's MAC address, router MAC address, user device's allocated-IP address, user device's original or actual IP address, and authorization state.

The user device MAC address field of a record for a user device contains the MAC address of the user device if it can be obtained by the VBN server. In the case of routed users, the VBN server does not need to obtain a user MAC as the VBN server can perform IP-address-based processing based on the router-aware IP address assignment. The VBN server 100 attempts to obtain the MAC address of a user device dynamically, e.g., in one of the following ways: 1) packet ethernet header inspection; 2) DHCP packet payload inspection; 3) SNMP query of a routing device or authorization assisting device, 4) extraction from authorization requests. The packet ethernet header inspection is used for bridged packets. The DHCP packet payload inspection is used for bridged or, especially, routed DHCP packets. The extraction from authorization requests is used for packets through authorization assisting devices.

The router MAC address field of a record for a user device contains the MAC address of the network device which is routing the user device. The VBN server 100 obtains this router's MAC address by inspection of packets' ethernet headers by the packet driver 160. For bridged entities and authorizing users, this field is set to the same value as the user device MAC address.

The allocated IP address field of a record for a user device contains the IP address which the VBN server 100 has allocated to the user device. For statically-addressed user devices, Network Address Translation (NAT) is transparently performed on this IP address, i.e., the user's static address is NATted to the allocated IP address field by the packet driver 160. For dynamically-addressed user devices which send dynamic addressing requests to the VBN server, this IP address is sent to the entity through the DHCP protocol. The VBN server 100 allocates IP addresses from different IP address ranges or pools: routed address ranges, bridged address ranges and authorization address ranges.

The original IP address field of a record for a user device contains the original IP address of the user device. For statically-addressed entities, the IP address of the actual, static address of the user device. For all other entities, the original IP field contains the same value as the assigned IP field. For routed and bridged entities, the original IP value is obtained by inspection of packets' IP headers, specifically the source IP address of packets originating from the entities on the LAN, by the packet driver 160. The original IP field is used by the packet driver 160 for performing NAT on statically-addressed routed and bridged entities. For entities which are authorizing with the VBN server from behind an authorization assisting device, the original IP field is explicitly set by the registration driver to be equal to the assigned IP field, and is not used by the packet driver.

The authorization state field of a record for a user device contains user authorization state, e.g., authorization start and end dates, other user authorization and/or billing data.

Figure 14:
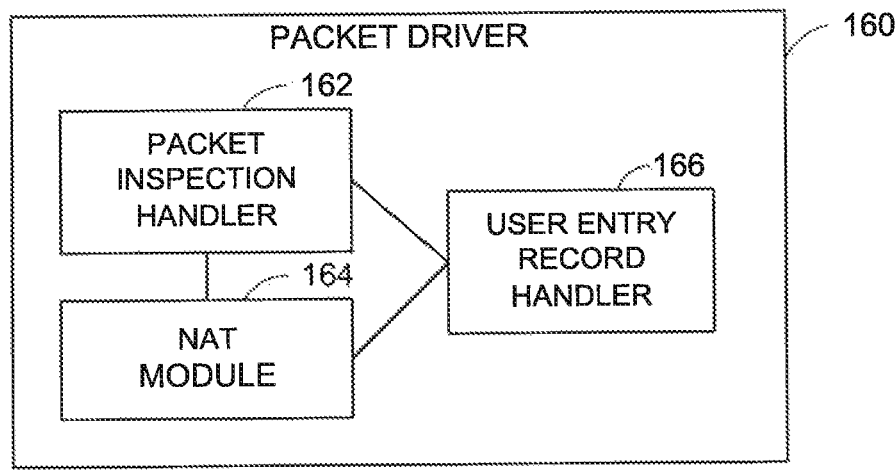
FIG. 14 is a block diagram showing an embodiment of a packet driver.

FIG. 14 shows an example of the packet driver 160. The packet driver 160 has a packet inspection handler 162, NAT module 164 and a user entry record handler 166.

The packet inspection handler 162 inspects each packet which is sent to or arrives from the LAN 102 behind the VBN server 100. The NAT module 164 performs the most basic function of the packet driver 160, i.e., performs Network Address Translation (NAT) on user packets, changing the IP address to or from the IP address which the VBN server 100 has assigned to the user device. The user entry record handler 166 attempts to retrieve or create a user entry record for each packet, based upon the packet's source MAC address, and update certain fields within that record. The user entry record handler 166 may work with the data entry handler 118 of the registration driver 110 or may be part of the data entry handler 118.

The packet driver 160 helps the VBN server 100 process routed user traffic, by determining if the source MAC address of an incoming packet is that of a known router. If it is, then the packet driver 160 performs some special actions, which involve either retrieving or creating a user entry record for each packet, based upon the packet's source MAC address and/or the packet's source IP address. The packet driver 160 may be similar to the packet driver as described in U.S. Pat. No. 7,007,080 issued on Feb. 28, 2006 and Canadian patent application publication No. 2,457,368 published on Aug. 11, 2005, which are hereby incorporated by reference.

In most cases, the packet driver 160 is capable of creating a new user entry record which corresponds to an incoming packet. However, in some complicated cases, such as DHCP DISCOVER packets, or during a user device's traversal of routing realms, the packet driver 160 cannot create a new user entry record, because the packet driver 160 examines only the ethernet and IP headers of a packet, not the packet's payload. The dynamic address request handler or DHCP request handler 140 attempts to create new user entry records for those DHCP packets which surpass the capabilities of packet driver 160, as further described below.

Figure 16:
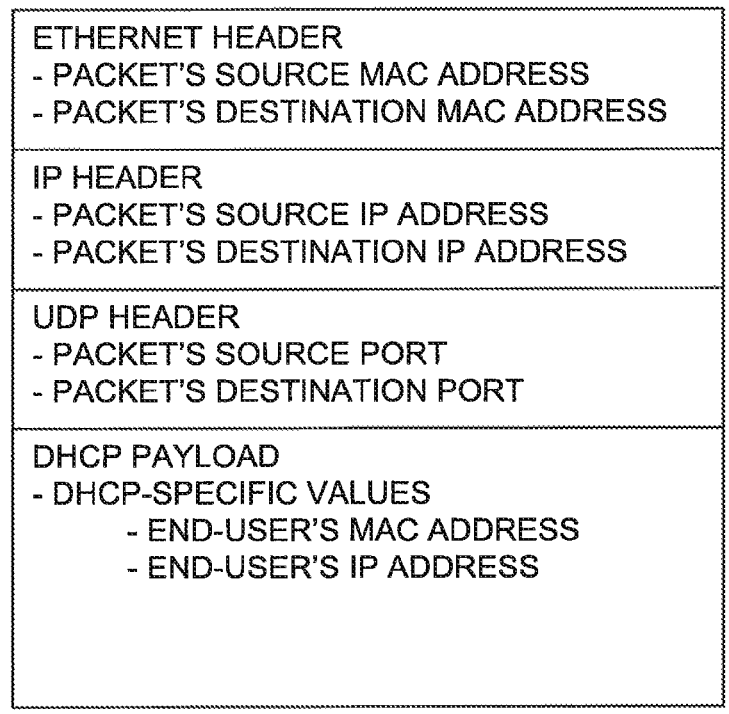
FIG. 16 is a diagram showing an example of a DHCP packet.

As shown in FIG. 16, a DHCP packet consists of an ethernet header, IP header, UDP header and DHCP payload. The ethernet header contains the packet's source MAC address and destination MAC address. The IP header contains packet's source IP address and destination IP address. The UDP Header contains packet's source Port and destination Port. The DHCP Payload contains several DHCP-specific values, including user MAC and IP addresses.

For a bridged user packet, the source MAC address is the same as the user device or user MAC address, and the source IP address is the same as the user device or user IP address.

For a routed user packet, the source MAC address is altered to be that of the router, and the source IP address may be set to that of the router. The actual user addresses are therefore reliably contained only within the DHCP payload.

Network devices which interconnect distinct subnetworks, such as routers, often possess mechanisms to facilitate the communication of DHCP packets from one subnetwork to another. Explicit mechanisms to do so are required because a single DHCP server often services several interconnected subnetworks. The most common such mechanism is DHCP Relay, an Internet standard. A more proprietary alternative to DHCP Relay is used by certain Cisco and Motorola routing devices, and will be arbitrarily referred to as DHCP Forwarding within this document. A routing device which lacks both a DHCP Relay mechanism and a DHCP Forwarding mechanism does not retransmit DHCP traffic from one subnetwork to another.

Figure 17:
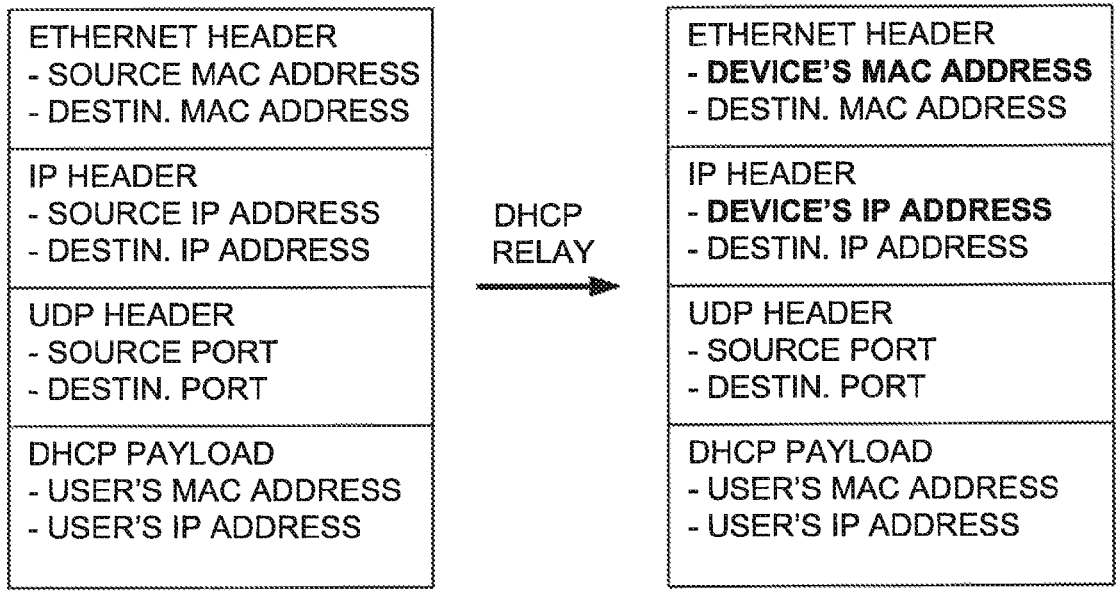
FIG. 17 is a diagram showing an example of DHCP relay.

DHCP Relay alters the ethernet and IP headers of a DHCP packet so that those headers contain source addresses of the external MAC and IP addresses of the DHCP Relaying device, as shown in FIG. 17. The DHCP payload within the packet is not altered by DHCP Relay, and therefore still contains the MAC and IP addresses of the originator of the DHCP packet. Both bridging and routing devices may DHCP Relay DHCP packets, although it is rare, and unnecessary, for a bridging device to do so.

DHCP Forwarding alters only the source MAC address of the DHCP packet, to be the external MAC address of the forwarding device. The packet's source IP address, and the contents of the DHCP payload, are not altered by DHCP Forwarding. Only routing devices are known to perform this type of DHCP Forwarding.

The DHCP request handler 140 can successfully process bridged, DHCP Relayed, and DHCP Forwarded DHCP packets. In order for the DHCP request handler 140 to handle DHCP Relayed or Forwarded packets, the VBN server 100 has prior knowledge of the external MAC addresses and IP addresses of the DHCP Relaying or Forwarding devices, i.e., these addresses are stored in the registration data store 112 in advance.

Figure 15:
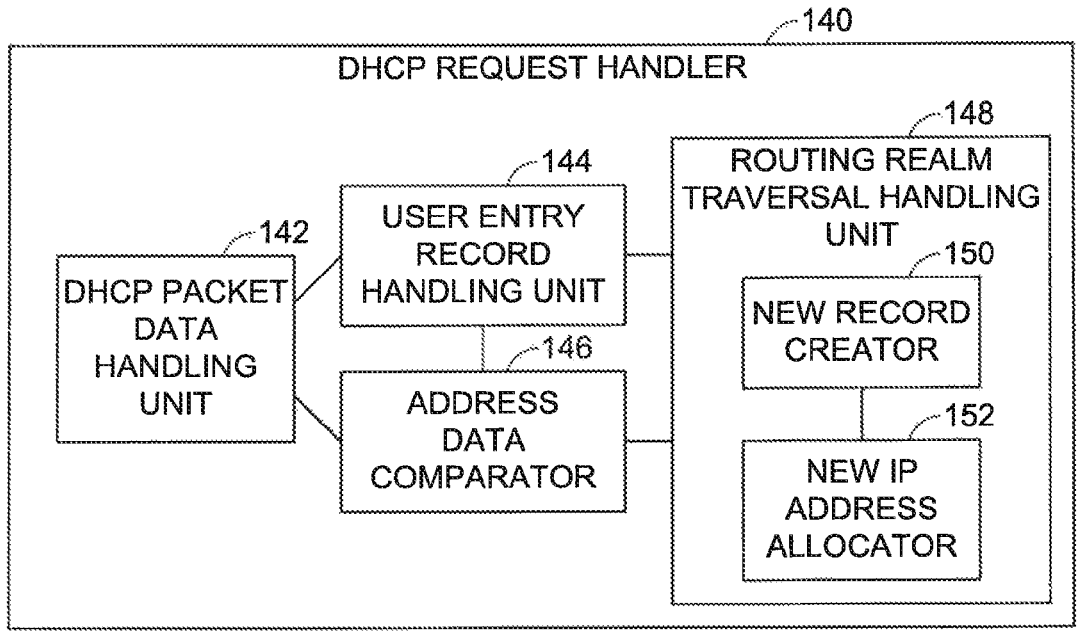
FIG. 15 is a block diagram showing an embodiment of a Dynamic Host Configuration Protocol (DHCP) request handler.

FIG. 15 shows an embodiment of the dynamic address request handler as a DHCP request handler 140. In this embodiment, the DHCP request handler 140 comprising a DHCP packet data handling unit 142, a user entry record handling unit 144, an address data comparator 146 and a routing realm traversal handling unit 148. The routing realm traversal handling unit 148 has a new record creator 150 and a new IP address allocator 152.

Figure 18:
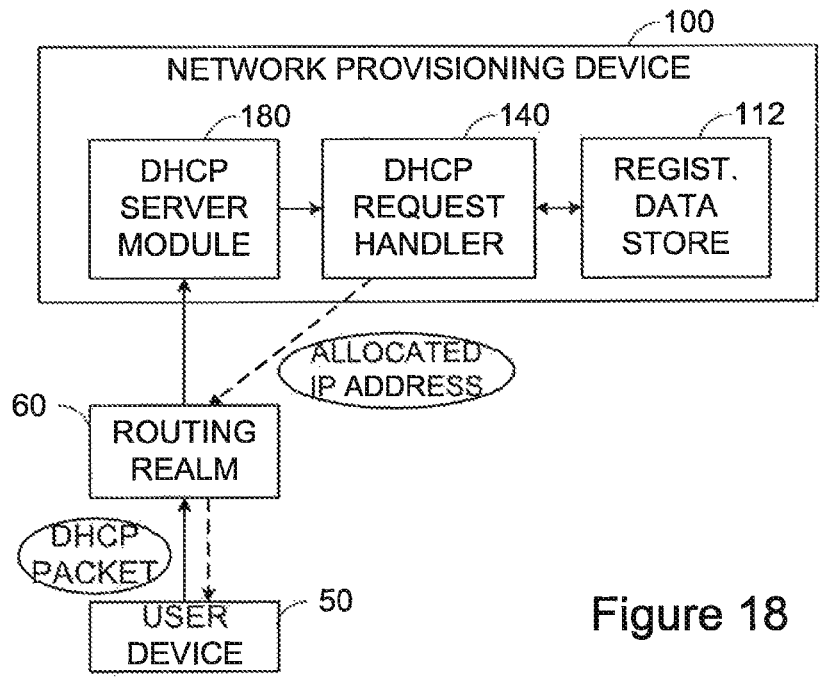
FIG. 18 is a diagram showing a data flow according to an embodiment of the VBN server.

FIG. 18 shows an example of the flow of data when a user device 50 sends a DHCP packet through a routing realm 60. A DHCP server module 180 receives the DHCP packet and passes DHCP packet data, such as MAC and IP addresses in DHCP packets, to the DHCP packet data handling unit 142 of the DHCP request handler 140. The DHCP request handler 140 accesses and manipulates records in the registration data store 112 through the user entry record handling unit 144. The address data comparator 146 compares the DHCP packet data and user entry records. If it is determined that the user device 50 traversed routing realms based on the comparison, the new record creator 150 of the routing realm traversal handling unit 148 creates a new record for the traversed user device 50 with a new IP address allocated from a relevant one of the IP address ranges by the new IP address allocator 152 so that the allocated IP address is suitable for the routing device or authorization assisting unit in the newly entered routing realm. The routing realm traversal handling unit 148 replaces the new record with the existing record for the user device 50 in the user entry record 120 through the user entry record handling unit 144. The DHCP request handler 140 provides the newly allocated IP address to the user device 50 if the allocated IP address does not belong to an authorization address range.

The new record creator 150 may work with the data entry handler 118 of the registration driver 110 or may be part of the data entry handler 118. Similarly, the new IP address allocator 152 may work with the IP address assignment handler 116 of the registration driver 110 or may be part of the IP address assignment handler 116.

Figure 19:
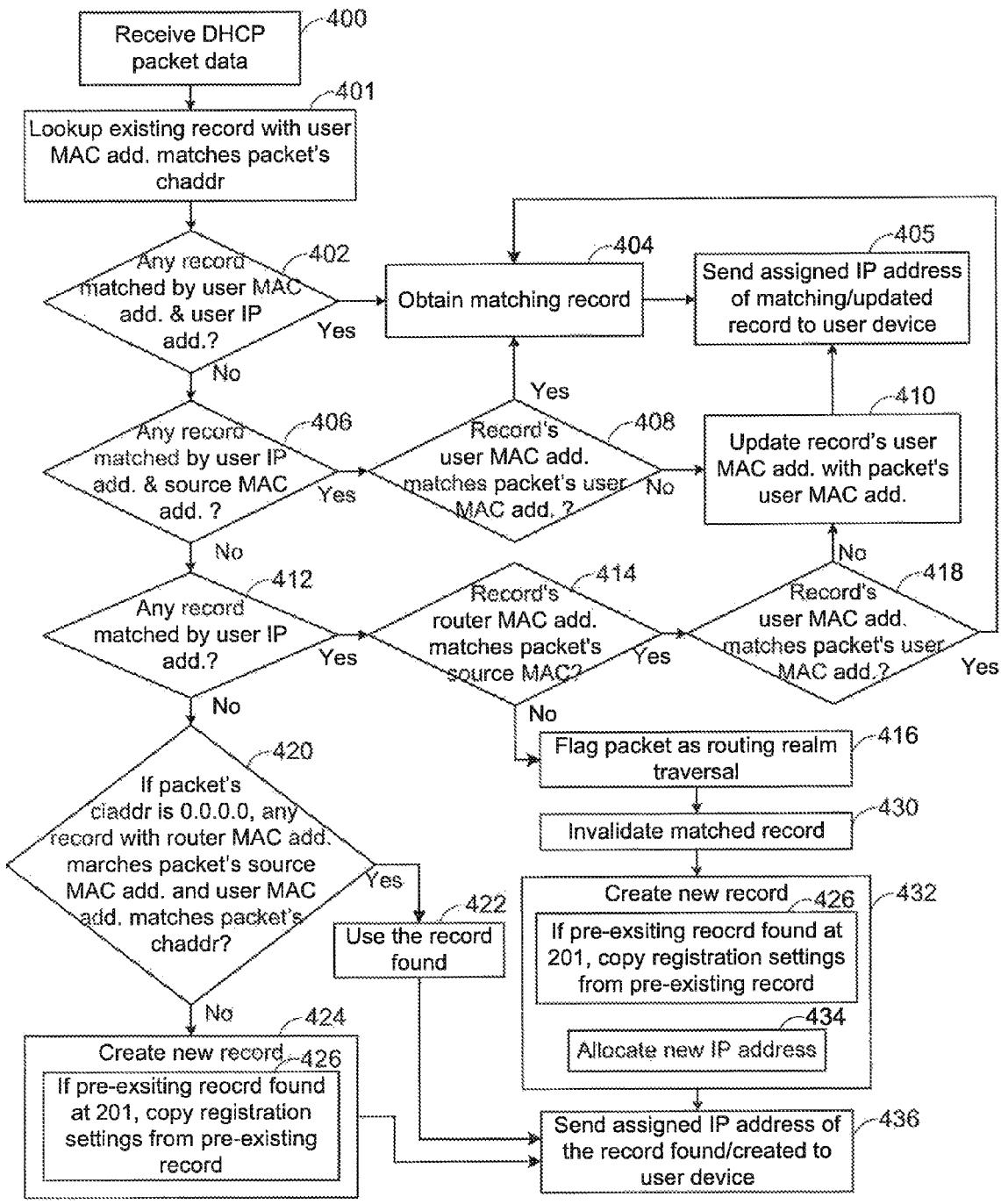
FIG. 19 is a flowchart showing an embodiment of the roaming handling operation of the VBN server.

Referring to FIG. 19, an embodiment of the operation of the DHCP request handler 140 is described. When a DHCP server module 180 of the VBN server 100 receives a DHCP packet, the DHCP request handler 140 is passed data of the DHCP packet from the DHCP server module 180 (400). The data includes a source MAC address, source IP address, user MAC address and user IP address of a DHCP packet. The source MAC address is obtained from the ethernet header. This may be either the user's MAC address, or a router's MAC address, or a DHCP Relayer's MAC address. The source IP address is obtained from the IP header. This may be either the user's current IP address, or DHCP Relaying device's IP address. The user MAC address is obtained from the DHCP payload. The user IP address is obtained from the DHCP payload. The user MAC address and user IP address may be hereinafter referred to as user's hardware address (chaddr) and user's current IP address (ciaddr).

Using this data of the received DHCP packet, the DHCP request handler 140 can obtain the user's pre-existing record from the registration data store 112, or create a new record representing that user device as follows.

The DHCP request handler 140 looks up the existing valid entry or record, if one exists, which possesses a user MAC address equal to the user MAC address chaddr of the DHCP packet (401). There is guaranteed to be no more than one such valid entry at a time within the registration driver. This lookup ignores the entry's router MAC address and the entry's assigned IP address, and thus, the entry that is obtained may not be appropriate for the user device. However, if it is not appropriate for the user device, this entry represents the user device's most recent state, i.e. the most recent router to which the user device was connected. This entry, if it exists, is used only as the source of the user's current registration settings, to be copied into a new record which may be created by the DHCP handler, once that new record has been created at step 424 as described below.

The DHCP request handler 140 attempts to locate a matching record in the registration data store 112 by user MAC address and user IP address (402). If it locates a matched record, the DHCP request handler 140 obtains the user's pre-existing record (404).

If there is no matching record at step 402, then the DHCP request handler 140 attempts to match record by user IP address and source MAC address (406). If it locates a corresponding record, the DHCP request handler 140 determines if the user MAC address of the corresponding record matches that of the received DHCP packet (408). If it matches, the DHCP request handler 140 obtains the corresponding record (404). If it does not match, then the DHCP request handler 140 updates the record's user MAC address to be the user MAC address of the received DHCP packet (410).

If there is no match at step 406, then the DHCP request handler 140 attempts to match record by user IP address (412). If it locates a corresponding record (R), the DHCP request handler 140 determines if the router MAC address of the corresponding record (R) matches the source MAC address of the received DHCP packet (414). If it does not match the DHCP packet's source MAC address, then the DHCP request handler 140 flags this packet as an indication of a routing realm traversal by the user device identified within the DHCP packet's payload (416). If the router MAC address of the corresponding record (R) does match the source MAC address of the DHCP packet (414), then the DHCP request handler 140 determines if the user MAC address of the corresponding record (R) matches the user MAC address of the DHCP packet (418). If it does not match the user MAC address of the DHCP packet at step 418, then the DHCP request handler 140 updates the user MAC address of the corresponding record (R) with the user MAC address of the DHCP packet (410), and sends the assigned IP address of the updated record is sent to the user device (405). If the user MAC address of the corresponding record (R) matches the user MAC address of the DHCP packet at step 418, then the DHCP request handler 140 executes step 404, and sends the assigned IP address of the matching record, i.e., the existing registration driver entry, to the user device (405).

If there is no match at step 412, then if the DHCP packet's ciaddr is 0.0.0.0, the DHCP request handler 140 looks up an existing entry or record which posses (a) a router MAC address equal to the source MAC address of the DHCP packet and (b) a client MAC address equal to the user MAC address chaddr of the DHCP packet (420). This step 420 handles the case of a DHCP DISCOVER packet being sent from a user who has not roamed between routers. If this step finds an entry, then that entry is used (422). If this step 420 does not find an entry, then the DHCP request handler 140 creates a new record (424) based upon the user's MAC address, DHCP packet's source MAC address, and, if possible, the DHCP packet's user IP address.

If the DHCP request handler 140 has detected a routing realm traversal (416), the DHCP request handler 140 invalidates the corresponding record (R) within the registration data store 112 (430), and creates a new record (432) based upon the user's MAC address, and the DHCP packet's source MAC address. The DHCP request handler 140 allocates a new IP address to the user device from one of the assignable IP address ranges of the VBN server 100, appropriate to the user device's new routing realm (434). The new record contains the registration settings from the invalidated record, such as authorization start and end times, and billing information. If the new IP address belongs to one of the routing or bridge address ranges, the new IP address is sent back to the user device (436) so that the user device can access services of the VBN server 100 using the new IP address.

Whenever the DHCP request handler 140 creates a new record at step 424 or step 432, it checks to see if a pre-existing record from was found at step 401, and if so, the registration settings from that pre-existing record are copied into the new record (426). This copying of registration settings is done by the DHCP request handler 140 after the DHCP request handler 140 has performed all of its other actions, but before the DHCP request handler 140 returns an assigned IP address to the DHCP service 180 for sending it to the user device (436).

The following is the process carried out by the DHCP request handler 140:

receive data of the DHCP packet from the DHCP service 180
 find a pre-existing record P which possesses a user MAC address equal to the user MAC address chaddr of the DHCP packet
 find or create an appropriate registration driver record
 if a new record is created, and a pre-existing record P was found, then
  copy registration settings from record P into the new record
 end if
 return appropriate record's assigned IP address to the DHCP service 180

Thus, the VBN server 100 can support routing realm traversal. When an user device traverses a routing realm behind a properly configured VBN server 100, the user device is forced to acquire a new IP address via DHCP. There are no other interruptions or changes in the service provided by the VBN server 100, including the billing service. The VBN server 100 can handle traversals from layer-2 to layer-3 subnetworks, layer-3 to layer-2 subnetworks, and layer-3 to layer-3 subnetworks. The VBN server 100 can also handle traversals from layer-2 subnetworks to layer-2 subnetworks, although there is no explicit roaming support required for such traversals, since all top-level bridging subnetworks share a common IP address space.

Sample operation of the remote roaming mechanism are now described referring to FIGS. 20-27.

Figure 20:
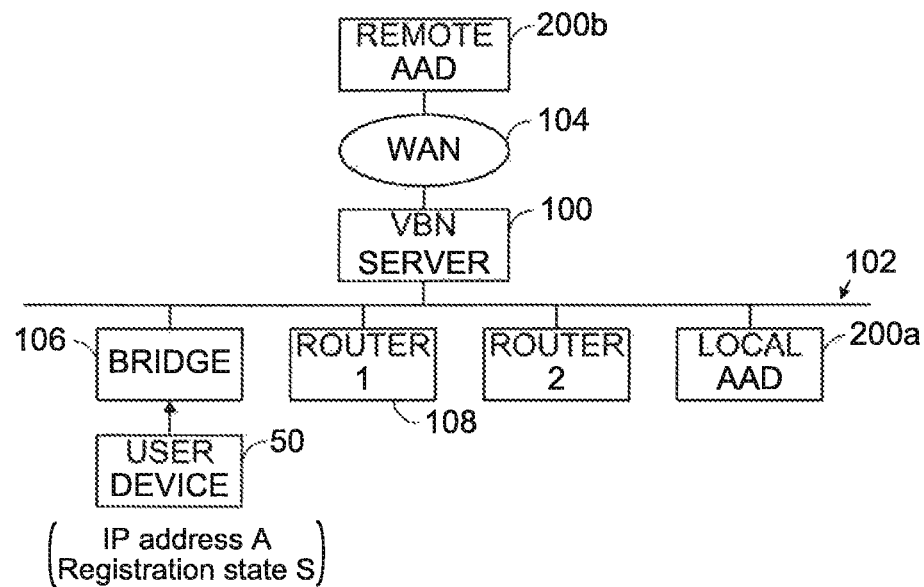
FIG. 20 is a diagram showing an example of locations of network entities with a roaming user device.

In FIG. 20, a user device 50 is connected to a sub-network behind a bridge 106 on the LAN 102 of the VBN server 100. The user device 50 is assigned with IP address A by the VBN server 100 from an address range for the bridge 106. The VBN server 100 maintains a record of the user device 50 with the assigned IP address A and registration state S, as well as other data including the MAC address of the user device 50.

Figure 21:
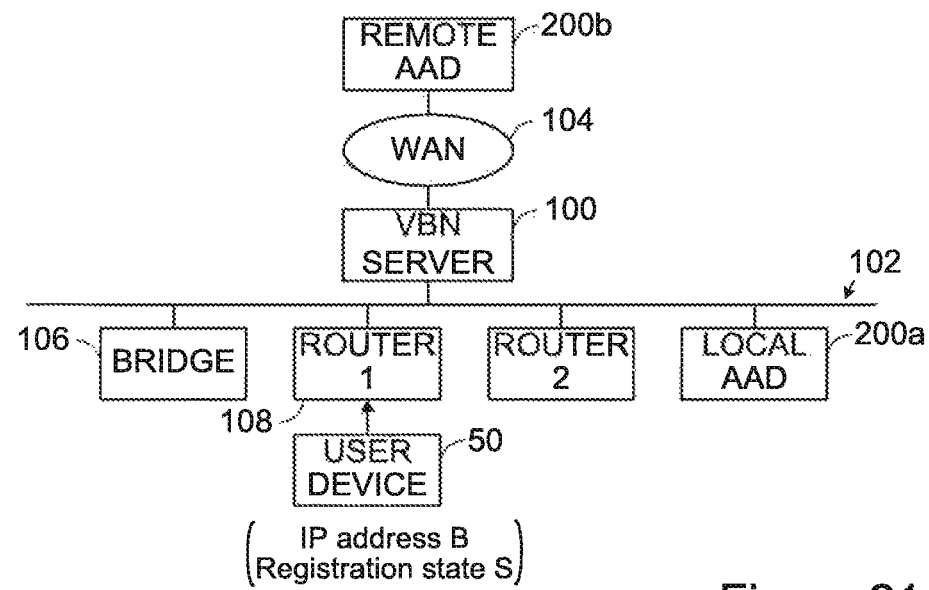
FIG. 21 is a diagram showing an example of roaming of the user device.

When the user device 50 moves to a sub-network behind a first router 108 on the LAN 102, as shown in FIG. 21, the VBN server 100 assigns to the user device 50 a new IP address B from an address range for the first router 108. The VBN server 100 creates a new record of the user device 50 with the assigned IP address B, maintaining the registration state S.

Figure 22:
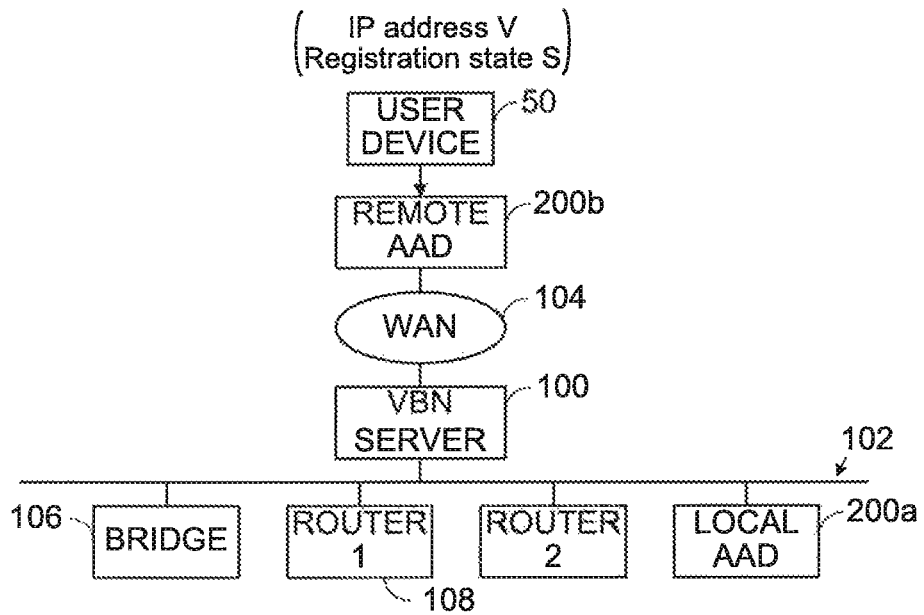
FIG. 22 is a diagram showing another example of roaming of the user device.

When the user device 50 moves to a sub-network behind a remote authorization assisting device 200b on the WAN 104 of the VBN server 100, as shown in FIG. 22, the VBN server 100 assigns to the user device 50 a new IP address P from an authorization address range. This assigned IP address P is not sent to the user device 50. The user device 50 obtains an IP address V. IP Address V is assigned from a third-party device, which is typically the authorization assisting device 200b, but may be another device visible to the user device. The VBN server is not involved in the assignment of address V, or in the communication of address V to the user device. The VBN server 100 creates a new record of the user device 50 with the assigned IP address P, maintaining the registration state S.

Figure 23:
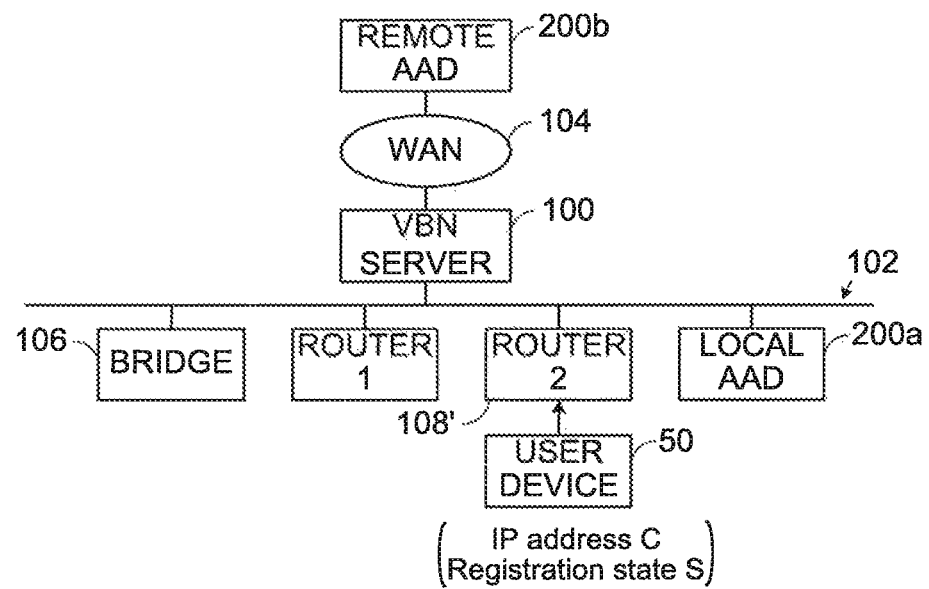
FIG. 23 is a diagram showing another example of roaming of the user device.

When the user device 50 moves to a sub-network behind a second router 108' on the LAN 102, as shown in FIG. 23, the VBN server 100 assigns to the user device 50 a new IP address C from an address range for the second router 108'. The VBN server 100 creates a new record of the user device 50 with the assigned IP address C, maintaining the registration state S.

Figure 24:
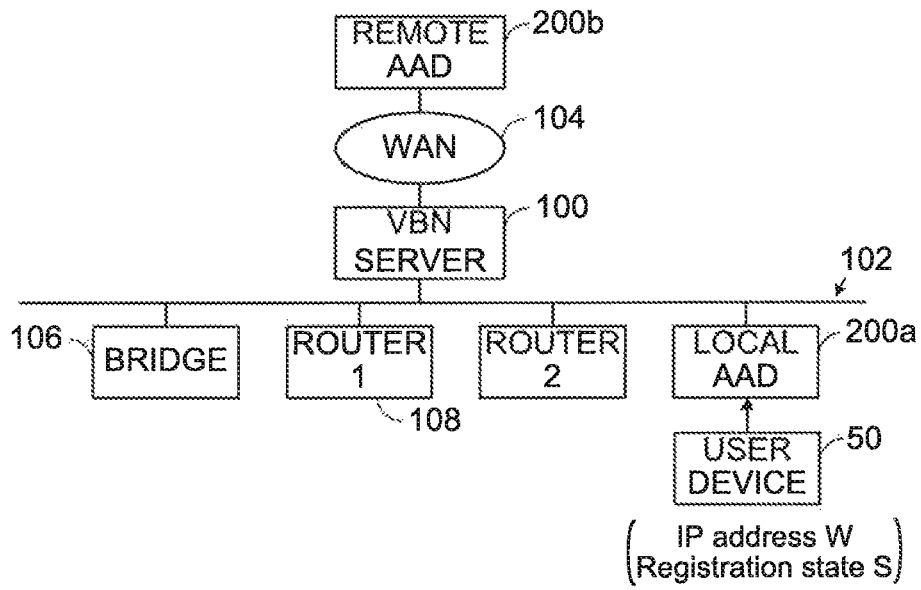
FIG. 24 is a diagram showing another example of roaming of the user device.

When the user device 50 moves to a sub-network behind a local authorization assisting device 200a on the LAN 102, as shown in FIG. 24, the VBN server 100 assigns to the user device 50 a new IP address Q from an authorization address range, which may be the same as or different from the authorization address range used in FIG. 22. This assigned IP address Q is not sent to the user device 50. The user device 50 obtains an IP address W, which is assigned by the authorization assisting device 200a or other third-party device. The VBN server 100 creates a new record of the user device 50 with the assigned IP address Q, maintaining the registration state S.

Figure 25:
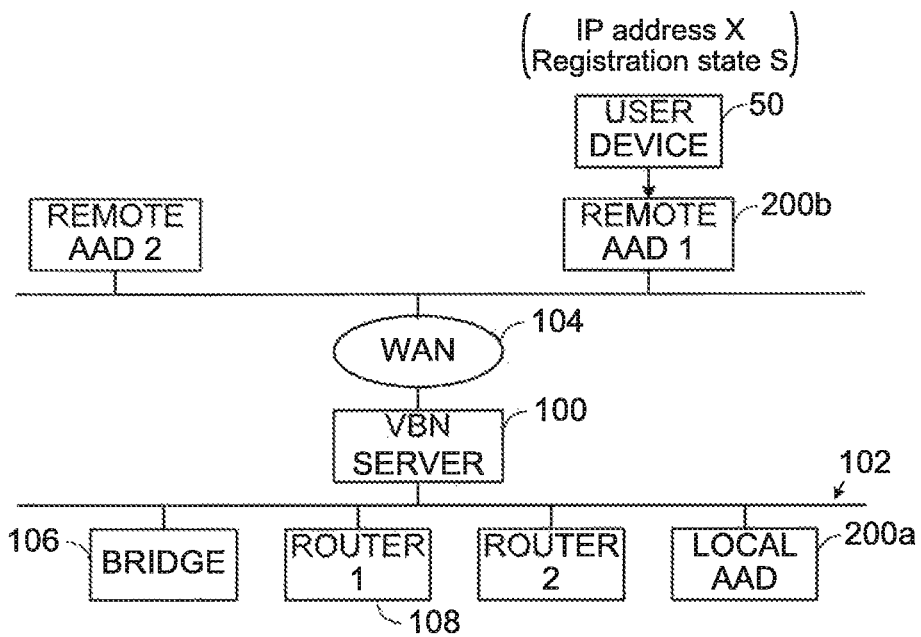
FIG. 25 is a diagram showing another example of roaming of the user device.

When the user device 50 moves to a sub-network behind a first remote authorization assisting device 200b on the WAN 104, as shown in FIG. 25, the VBN server 100 assigns to the user device 50 a new IP address R from an authorization address range, which may be the same as or different from the authorization address range used in FIG. 22 or 24. This assigned IP address R is not sent to the user device 50. The user device 50 obtains an IP address X, which is assigned by the authorization assisting device 200b or other third-party device. The VBN server 100 creates a new record of the user device 50 with the assigned IP address R, maintaining the registration state S.

Figure 26:
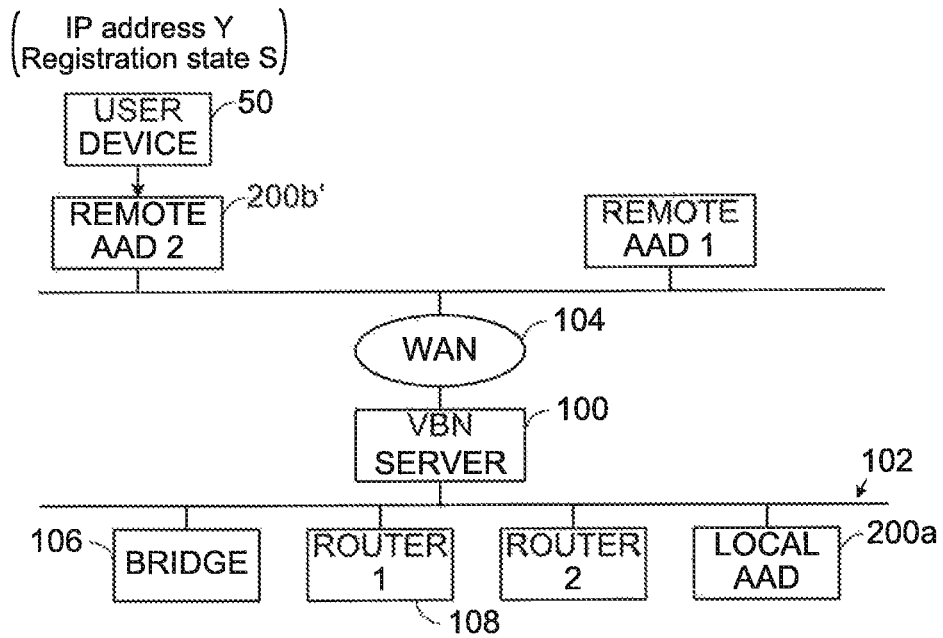
FIG. 26 is a diagram showing another example of roaming of the user device.

When the user device 50 moves to a sub-network behind a second remote authorization assisting device 200b' on the WAN 104, as shown in FIG. 26, the VBN server 100 assigns to the user device 50 a new IP address T from an authorization address range, which may be the same as or different from the authorization address range used in FIG. 22, 24 or 25. This assigned IP address T is not sent to the user device 50. The user device 50 obtains an IP address Y, which is assigned by the authorization assisting device 200b' or other third-party device. The VBN server 100 creates a new record of the user device 50 with the assigned IP address T, maintaining the registration state S.

Figure 27:
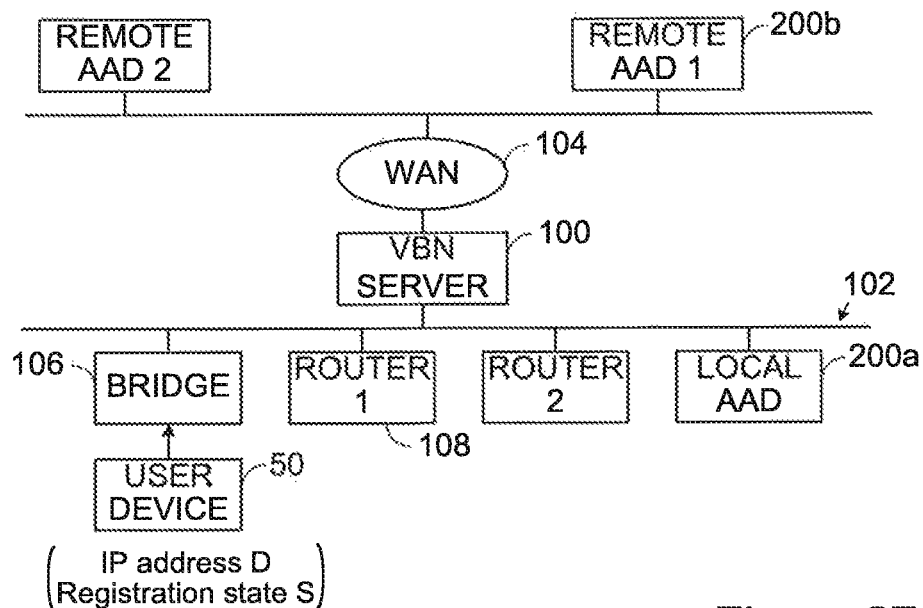
FIG. 27 is a diagram showing another example of roaming of the user device.

When the user device 50 moves back to the bridge 106 on the LAN 102, as shown in FIG. 27, the VBN server 100 assigns to the user device 50 a new IP address D from an address range for the bridge 106. The VBN server 100 creates a new record of the user device 50 with the assigned IP address D, maintaining the registration state S.

Accordingly, the VBN server 100 can automatically handle roaming user devices, including those using authorization assisting devices and roaming on the LAN 102 or WAN 104, without requiring re-registration with the VBN server 100. Thus, it is possible to maintain data of the user devices, e.g., billing and identification data, regardless of the roaming of those user devices.

The VBN server and the remote roaming management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the VBN server and the remote roaming management system are described separately, however, two or more elements may be provided as a single element, or one or more elements may be shared with other components in one or more computer systems.

What is claimed is:

1. A remote roaming management system for managing access to a wide area network (WAN) by user devices, the remote roaming management system comprising:

a visitor based network (VBN) server that is connected to the WAN and manages network traffic routing between the WAN and network entities on a local area network (LAN) behind the VBN server;

an authorization assisting device that has network connectivity with the VBN server, and generates and sends to the VBN server on behalf of a requesting user device an authorization request for access to the WAN by the requesting user device, the authorization request incorporating information of the requesting user device;

a registration driver that manages registration of user devices, wherein the registration driver has a set of assignable internet protocol (IP) address ranges for multiple routing realms, and assigns an IP address to a user device from a relevant IP address range depending on a routing realm from which communication from the user device is received, the set of assignable IP address ranges including an authorization address range from which the registration driver assigns an IP address to a user device whose authorization request is received from the authorization assisting device;

a registration data store that stores registration data of registered user devices, registration data of a registered user device including its authorization state, assigned IP address, and user device's Media Access Control (MAC) address; and an authorization application module that processes the authorization request to automatically generate an authorization response granting or denying access to the WAN by the requesting user device based on the registration data in the registration data store and the information in the authorization request.

2. The remote roaming management system as claimed in claim 1, wherein the authorization assisting device is provided on the WAN and sends the authorization request to the VBN server on behalf of the requesting user device through the WAN; and the VBN server returns the authorization response to the authorization assisting device through the WAN.

3. The remote roaming management system as claimed in claim 1, wherein the authorization assisting device is provided on the LAN and sends the authorization request to the VBN server on behalf of the requesting user device through the LAN; and the VBN server returns the authorization response to the authorization assisting device through the LAN.

4. The remote roaming management system as claimed in claim 3, wherein the authorization assisting device has a NAT instructions module that performs Network Address Translation (NAT) on packets from the requesting user device, to change an IP address of the packets to or from an IP address of the authorization assisting device which VBN server has assigned.

5. The remote roaming management system as claimed in claim 1, wherein the authorization assisting device serves as a network gateway or router for the requesting user device so that WAN-bound traffic of the requesting user device flows through the authorization assisting device.

6. The remote roaming management system as claimed in claim 1, wherein the authorization assisting device has an authorization request generator that receives an access attempt signal for access to the WAN from the requesting user device and generates the authorization request incorporating information of the requesting user device based on the user access attempt signal.

7. The remote roaming management system as claimed in claim 6, wherein, the authorization assisting device has a MAC address extractor to extract a MAC address of the requesting user device from the access attempt signal;

the authorization request generator incorporates the MAC address of the requesting user device into the authorization request, and the authorization application module uses the MAC address of the requesting user device in the authorization request to determine if there is any appropriate pre-existing registration data of the requesting user device in the registration data store, or to create a new appropriate entry within the registration data store.

8. The remote roaming management system as claimed in claim 1, wherein the authorization assisting device has a user WAN access handler that allows or denies the access to the WAN by the requesting user device based on the authorization response.

9. The remote roaming management system as claimed in claim 1, wherein the authorization assisting device has a forced authorization portal handler that presents an authorization portal to the requesting user device to collect authorization request parameters to be included in the authorization request.

10. The remote roaming management system as claimed in claim 1, wherein the remote roaming management system comprises multiple authorization assistant units, each communicating with the VBN server through the LAN or WAN;

the registration driver manages multiple authorization address ranges, and the VBN server assigns an IP address from any one of the authorization address ranges to a user device regardless of which authorization assistant unit sends an authorization request for the user device.

11. A visitor based network (VBN) server connected to a wide area network (WAN) for managing network traffic routing between the WAN and network entities on a local area network (LAN) behind the VBN server, the VBN server comprising:

a network entity interface handler that handles communication with an authorization assisting device that generates and sends to the VBN server on behalf of a requesting user device an authorization request for access to the WAN by the requesting user device, the authorization request incorporating information of the requesting user device;

a registration driver that manages registration of user devices, wherein the registration driver has a set of assignable internet protocol (IP) address ranges for multiple routing realms, and assigns an IP address to a user device from a relevant IP address range depending on a routing realm from which communication from the user device is received, the set of assignable IP address ranges including an authorization address range from which the registration driver assigns an IP address to a user device whose authorization request is received from the authorization assisting device;

a registration data store that stores registration data of registered user devices, registration data of a registered user device including its authorization state, assigned IP address, and user device's Media Access Control (MAC) address; and an authorization application module that processes the authorization request to automatically generate an authorization response granting or denying the access to the WAN by the requesting user device based on the registration data in the registration data store and the information in the authorization request.

12. The VBN server as claimed in claim 11 further comprising:

a packet driver that inspects packets arriving from and directed to a user device, and interacts with the registration data store to process the packets; and a dynamic address request handler that examines data in a dynamic address request packet received from the user device and the registration data in the registration data store, wherein at least one of the packet driver and the dynamic address request handler automatically detects roaming of the user device between routing realms based on the data of the packets and the registration data store, and have a new IP address assigned to the user device from a relevant IP address range when roaming of the user device is detected.

13. The VBN server as claimed in claim 11, wherein the network entity interface handler handles communication with the authorization assisting device via the LAN or WAN.

14. The VBN server as claimed in claim 13, wherein the network entity interface handler has an authorization message translator that translates the authorization request and the authorization response from and to the authorization assisting device between an authorization assisting device format and a VBN server format.

15. The VBN server as claimed in claim 11, wherein the authorization application module has an authorization response generator that generates the authorization response by comparing the information of the requesting user device in the authorization request with the registration data in the registration data store using user MAC addresses, and creates a new registration entry if there is no match, if a matched existing registration entry does not have an IP address from the authorization address range, or if a matched existing registration entry having an IP address from the authorization address range does not possess an authorizing assisting device IP address equal to that possessed by the user's current authorization assisting device.

16. The VBN server as claimed in claim 15, wherein the authorization response generator obtains a MAC address of the requesting user device from the authorization request when it is available in the authorization request.

17. The VBN server as claimed in claim 15, wherein the authorization application module has a user MAC query module that queries the authorization assisting device to which the requesting user device is currently connected for a MAC address of the requesting user device when it is unavailable in the authorization request.

18. The VBN server as claimed in claim 11, wherein the authorization application module has an authorization duration handler that monitors expiration of an authorization period of the requesting user device, and automatically sends an authorization termination message to the authorization assisting device when the authorization period has expired.

19. A method of managing access to a wide area network (WAN) by user devices, the method comprising the steps of:
receiving, by a Visitor Based Network (VBN) server from an authorization assisting device, an authorization request for access to a Wide Area Network (WAN) by a requesting user device generated and sent by the authorization assisting device on behalf of the requesting user device, the authorization request incorporating information of the requesting user device, the VBN server managing a set of assignable internet protocol (IP) address ranges, including an authorization address range and one or more routed address ranges and/or one or more bridged address ranges, each of the routed and bridged address ranges being associated with a routing realm behind the VBN server;
assigning to the requesting user device an IP address from the authorization address range; and
processing the authorization request to automatically generate an authorization response granting or denying the access to the WAN by the requesting user device based on the information in the authorization request and registration data of registered user devices stored in a registration data store, registration data of a registered user device including its authorization state, assigned IP address, and user device's Media Access Control (MAC) address.

20. The method as recited in claim 19, further comprising the steps of:
inspecting packets arriving from and directed to a user device to obtain address information of the packets;
searching the registration data store for any registration data record that has address information corresponding to the address information of the packets, and creating new entries if there is no match, if a matched existing registration entry does not have an IP address from the authorization address range, or if a matched existing registration entry having an IP address from the authorization address range does not possess an authorizing assisting device IP address equal to that possessed by the user's current authorization assisting device; and,
automatically detecting roaming between routing realms by the user device based on the address information of the packets and the registration data record; and
assigning a new IP address from a relevant IP address range to the user device when roaming by the user device is detected.

21. The Method as claimed in claim 19, wherein the receiving step receives the authorization request via the WAN or a local area network (LAN) behind the VBN server.

22. The Method as claimed in claim 19, wherein the receiving step translates the authorization request from an authorization assisting device format to a VBN server format.

23. The Method as claimed in claim 19, wherein the processing step compares the information of the requesting user device in the authorization request with the registration data in the registration data store using user MAC addresses.

24. The Method as claimed in claim 23, wherein the processing step obtains a MAC address of the requesting user device from the authorization request when it is available in the authorization request.

25. The Method as claimed in claim 23, wherein the processing step queries the authorization assisting device to which the requesting user device is currently connected for a MAC address of the requesting user device when it is unavailable in the authorization request.

26. The Method as claimed in claim 19, further comprising the steps of
monitoring expiration of an authorization period of the requesting user device, and
automatically sending an authorization termination message to the authorization assisting device when the authorization period has expired.

27. A non-transitory computer readable medium storing computer readable code for execution in a computer, the code having instructions for implementing a method of managing access to a wide area network (WAN) by user devices, the instructions comprising the steps of:
receiving, by a Visitor Based Network (VBN) server from an authorization assisting device, an authorization request for access to a Wide Area Network (WAN) by a requesting user device generated and sent by the authorization assisting device on behalf of the requesting user device, the authorization request incorporating information of the requesting user device, the VBN server managing a set of assignable internet protocol (IP) address ranges, including an authorization address range and one or more routed address ranges and/or one or more bridged address ranges, each of the routed and bridged address ranges being associated with a routing realm behind the VBN server;

assigning to the requesting user device an IP address from the authorization address range; and processing the authorization request to automatically generate an authorization response granting or denying the access to the WAN by the requesting user device based on the information in the authorization request and registration data of registered user devices stored in a registration data store, registration data of a registered user device including its authorization state, assigned IP address, and user device's Media Access Control (MAC) address.

\* \* \* \* \*